(12) United States Patent
Kiji

(10) Patent No.: US 7,805,504 B2
(45) Date of Patent: Sep. 28, 2010

(54) NETWORK DEVICE ALLOWING EASY SETUP AND COMPUTER PROGRAM THEREFOR

(75) Inventor: Takahiro Kiji, Higashiosaka (JP)

(73) Assignee: Silex Technology, Inc., Kyoto (JP)

( * ) Notice: Subject to any disclaimer, the term of this patent is extended or adjusted under 35 U.S.C. 154(b) by 402 days.

(21) Appl. No.: 11/844,539

(22) Filed: Aug. 24, 2007

(65) Prior Publication Data

US 2008/0059611 A1    Mar. 6, 2008

(30) Foreign Application Priority Data

Sep. 1, 2006    (JP) ............... 2006-237918

(51) Int. Cl.
*G06F 15/177*    (2006.01)

(52) U.S. Cl. ............... 709/220; 709/221; 709/222; 709/245

(58) Field of Classification Search ......... 709/220–223, 709/245
See application file for complete search history.

(56) References Cited

U.S. PATENT DOCUMENTS

| | | | | |
|---|---|---|---|---|
| 6,012,088 | A * | 1/2000 | Li et al. | 709/219 |
| 6,049,826 | A * | 4/2000 | Beser | 709/222 |
| 6,351,773 | B1 * | 2/2002 | Fijolek et al. | 709/228 |
| 6,657,991 | B1 * | 12/2003 | Akgun et al. | 370/352 |
| 6,728,232 | B2 * | 4/2004 | Hasty et al. | 370/338 |
| 6,754,318 | B2 * | 6/2004 | Oksman et al. | 379/93.28 |
| 6,778,505 | B1 * | 8/2004 | Bullman et al. | 370/254 |
| 7,281,036 | B1 * | 10/2007 | Lu et al. | 709/220 |
| 7,483,396 | B2 * | 1/2009 | Steindl | 370/254 |
| 2002/0004935 | A1 * | 1/2002 | Huotari et al. | 717/11 |
| 2006/0129677 | A1 | 6/2006 | Tamura | |
| 2006/0187905 | A1 | 8/2006 | Manabe | |

FOREIGN PATENT DOCUMENTS

| | | |
|---|---|---|
| JP | 2001-345802 | 12/2001 |
| JP | 2004-220240 | 8/2004 |
| JP | 2006-20017 | 1/2006 |
| JP | 2006-217476 | 8/2006 |

OTHER PUBLICATIONS

Notification of Reasons for Refusal, Jul. 10, 2009 (two files: original Japanese, translation).

* cited by examiner

*Primary Examiner*—Faruk Hamza
(74) *Attorney, Agent, or Firm*—Ogilvie Law Firm

(57) ABSTRACT

A network device operating in a configuring mode and a normal operational mode includes: a configuration parameter memory; a network interface; a dynamic address generating unit that generates two logical addresses, when a DHCP request is received in the configuring mode, and returning one logical address to a transmission source of the request and assigning the other to the network device; a name resolving unit that transmits, when a name resolving request is received in the configuring mode, a logical address of the network device to the transmission source regardless of the name; and a parameter setting unit storing a parameter value transmitted, after the logical address of the network device is transmitted by the identifier resolving unit to the transmission source, using the logical address by said transmission source. In the normal operational mode, a network function is realized using parameters in the memory.

10 Claims, 20 Drawing Sheets

WHEN PC ADDRESS IS FIXED (NBNS BROADCAST)

NETWORK DEVICE ALLOWING EASY SETUP AND COMPUTER PROGRAM THEREFOR

CROSS-REFERENCE TO RELATED APPLICATION

This non-provisional application claims priority under 35 U.S.C. §119(a) on Patent Application No. 2006-237918 filed in Japan on Sep. 1, 2006, the entire contents of which are hereby incorporated by reference.

BACKGROUND OF THE INVENTION

1. Field of the Invention

The present invention relates to a device to be connected to a network and, more specifically, to an improvement in a technique for configuring a network device which can be configured through an external device.

2. Description of the Background Art

Along with widespread use of the Internet, TCP/IP (Transmission Control Protocol/Internet Protocol) networks come to be utilized everywhere, including office networks and home networks. Technical innovations improved performances of electronic apparatuses dramatically, while prices thereof are decreased. Therefore, various and many devices come to be connected to such networks. By way of example, connection to a network of not only products seemingly having good affinity such as a personal computer (hereinafter referred to as a "PC"), a television receiver (hereinafter referred to as a "TV") and a hard disk recorder, but also home appliances of which connection to a network had conventionally never considered, such as a microwave oven and a refrigerator, has been proposed.

Considering connection of various and many devices as such to a network, initialization (initial configuration) of these devices poses a problem.

A device having a user interface of itself, such as a PC, may be configured in the following manner. Specifically, before connecting the device to a network, a setup dialog for network connection is displayed, to receive a user input. The input is checked in a prescribed manner, and if the result of checking is generally correct, a configuration for network connection is changed in accordance with the configuration, and the connection to the network is established with the changed configuration.

In contrast, a device not having a user interface of itself, such as a wireless or wired LAN (Local Area Network) represented by a print server, must receive a configuration input from the user in someway or another. The same is true for most of the home use appliances. If items to be set are small in number, configuration may be done by using dip switches or the like. For network connection, however, many items require settings and, in addition, it is often the case that the configuration information must be stored as character strings. Therefore, it is in most cases difficult to use such means.

A general solution to such a problem is, before connecting a device to a network, to connect the device to an external device such as a PC in one-to-one correspondence, and to set necessary information using the PC. Specifically, an HTTP (HyperText Transfer Protocol) server is activated in the device, and in accordance with information prepared beforehand, a form for configuration information to establish network connection (hereinafter referred to as "configuring form") is displayed on a browser of the PC. The user inputs necessary information to the form. Receiving the input to the form through the PC, the information is written to a prescribed memory area through an arbitrary process, from the HTTP server in the device. The device is once turned off and reactivated, so that the new configuration is validated, and the device in this state is connected to the network.

Following such a procedure, even a device not having a user interface of itself or a device having only a limited user interface can be re-configured for network connection.

Here, in order to access from a PC to the configuring form, a URI (Uniform Resource Identifier) serving as an identifier of the configuring form on the network, or an IP (Internet Protocol) address as a logical network address of the device, and an MAC (Media Access Control) address as a physical address of the device, are necessary.

Now, an IP address identifies position of a resource on the network and it is generally represented by a row of figures such as 192.168.0.1, which is difficult for people to understand. Therefore, generally, URI representation that is easier to understand is used to identify a host on the network, a path to a target file in the host, a file name and a protocol used. When the URI is designated, an IP address corresponding to the URI is determined, and the target file will be obtained by accessing the host. The browser searches for and displays a resource such as a document on the web in such a manner. Further, an HTTP server receiving a file request from a browser is generally set to return a default file, if no file name is specified by the request.

Therefore, assuming that an IP address indicating a position where the information for configuring the network device is stored has been set in advance in the network device and that the information is set accessibly under a default file name, the configuring form can be displayed when the user inputs the URI or the IP address to the browser.

For a user who cannot clearly understand the necessity of inputting such information, however, even the above described operation is too difficult. At least, such an operation would be troublesome to the user. This is a grave problem, when the device of interest is expected to be used at home, as in the case of a home use appliance.

One approach to solve such a problem is disclosed as a home gateway apparatus, in Japanese Patent Laying-Open No. 2004-220240. In the home gateway apparatus disclosed in Japanese Patent Laying-Open No. 2004-220240, when an HTTP request is sent from a PC connected to a network device and a log-in name or a password of an administrator of the gateway apparatus itself is not specified, that is, when conditions representing that the home gateway apparatus is in a state immediately after shipment are satisfied, a URI included in the HTTP request is forcibly changed to the URI of the configuring form of the network device itself. As a result, if a PC browser is set to access a prescribed URI at the time of activation, for example, the configuring form of the home gateway apparatus would be displayed on the PC browser.

The system described in Japanese Patent Laying-Open No. 2004-220240, however, is on the premise that, when the network device is connected to the PC for the first time, the IP addresses of the PC and the default gateway can be assigned through a DHCP (Dynamic Host Configuration Protocol) service in the network device. It is, however, not always the case. Network operation generally differs network by network, and expecting common conditions is unrealistic. Though it is possible to confirm network configuration of a PC in advance, such a task is troublesome for a user and, particularly for a novice user of a PC, it is quite difficult.

For instance, immediately after purchasing a PC, it is unknown whether the PC is configured to get an IP address assigned by the DHCP service or not. Further, a PC connected to the network device may be a PC that has been used on an existing network and, in that case, the IP address of the PC or the default gateway might have been already set. Therefore, it is not at all certain if setting of an IP address is possible through DHCP. Thus, the system disclosed in Japanese Patent Laying-Open No. 2004-220240 correctly operates only in very limited situations.

For a network device, it is necessary to provide a method that reliably displays the configuring form even to a user not very familiar with a network at the time of configuring initial information, without any knowledge of a PC to be connected. Such a method, however, is not yet available.

SUMMARY OF THE INVENTION

Therefore, one object of the present invention is to provide a network device allowing, when a configuring device is connected thereto, reliable setting of parameters for configuring the network device, using the configuring device, without imposing excessive burden on a user, as well as to a computer program therefor.

Another object of the present invention is to provide a network device to be connected to a TCP/IP network allowing, when a configuring device is connected thereto, reliable setting of parameters for configuration of the network device, using the configuring device regardless of any setting of the configuring device for network connection, without imposing excessive burden on a user, as well as to a computer program therefor.

According to the first aspect, the present invention provides a network device, operable with its operational mode switched between a first operational mode and a second operational mode. The network device includes: a memory for storing a configuration parameter of the network device; a network interface receiving a communication packet; an address generating unit, responsive to the network interface receiving a communication packet in the first operational mode, for generating a logical address on a network in accordance with a prescribed address generating scheme and for assigning the logical address to the network device; an identifier resolving server, responsive to the communication packet received by the network interface being a packet inquiring a logical address corresponding to an identifier of a resource on the network, for transmitting the logical address of the network device to a transmission source of the communication packet that inquired the logical address, regardless of the identifier; a parameter setting unit for storing in the memory, a value of a configuration parameter, transmitted in the first operational mode, after a logical address of the network device is transmitted by the identifier resolving server to the transmission source, using the logical address from the transmission source and received by the network interface, in the first operational mode; and a functional circuit for realizing a prescribed network function by communication using the value of the configuration parameter stored in the memory, in the second operational mode.

Preferably, the address generating unit includes a DHCP server, responsive to the network interface receiving a logical address assignment requesting packet, in the first operational mode, for generating first and second logical addresses of mutually communicable relation in accordance with a prescribed address determining scheme, and for returning the first logical address to the transmission source and for assigning the second logical address to the network device.

According to a second aspect, the present invention provides a network device operable with its operational mode switched between a first operational mode and a second operational mode. The network device includes: a memory for storing a configuration parameter of the network device; a network interface receiving a communication packet; a physical address response server, responsive to the network interface receiving a communication packet inquiring a physical address corresponding to a specific logical address on a network in the first operational mode, for assigning the specific logical address to the network device regardless of the specific logical address, and for returning a physical address of the network device as the inquired physical address, to the transmission source of the communication packet inquiring the physical address; a parameter setting unit for storing in the memory, a value of configuration parameter, transmitted in the first operational mode, after the physical address of the network device is transmitted by the physical address response server to the transmission source, using the specific logical address from the transmission source and received by the network interface; and a functional circuit realizing a prescribed network function by communication using the value of the configuration parameter stored in the memory, in the second operational mode.

According to a third aspect, the present invention provides a network device, operable with its operational mode switched between a first operational mode and a second operational mode. The network device includes: a memory for storing a configuration parameter of the network device; a network interface for transmitting and receiving a communication packet to and from a communication device; an address information setting unit, activated in the first operational mode, for assigning a logical address to the network device and determining address information to be stored in the communication device, through interaction with the communication device, such that a communication packet of a specific protocol transmitted from the communication device will be directed to the network device; a parameter setting unit, activated in the first operational mode, for receiving a value of a configuration parameter of the network device from the communication device, through communication with the communication device using the specific protocol, and for storing the value in the memory; and a functional circuit, activated in the second operational mode, for realizing a prescribed network function, by a communication using the value for the configuration parameter stored in the memory.

According to a fourth aspect, the present invention provides a network device operable with its operational mode switched between a first operational mode and a second operational mode. The network device includes a memory; a network interface; and a computer connected to the memory and to the network interface and programmed with a prescribed computer program. The computer is programmed by the prescribed computer program, to function as: an address information setting unit, activated in the first operational mode, for assigning a logical address of the network device and determining address information to be stored in a communication device, through exchange of address information with the communication device using the network interface such that a communication packet of a specific protocol transmitted from the communication device will be directed to a physical address of the network device; a parameter setting unit, activated in the first operational mode, for receiving a value of the configuration parameter of the network device from the communication device through communication with the communication device using the specific protocol, and for storing the value in the memory; and a functional circuit activated in the second operational mode, for realizing a prescribed network function by a communication using the value for configuration parameter stored in the memory.

Preferably, the computer is further programmed by the computer program such that the address information setting unit includes a dynamic address generating server responsive to the network interface receiving a packet requesting logical address assignment in the first operational mode, for generating first and second logical addresses of mutually communicable relation in accordance with a prescribed address determining scheme, and for returning the first logical address to the transmission source of the assignment requesting packet and for assigning the second logical address to the network device.

As described above, according to the present invention, it is unnecessary for the user to know which logical address he/she must access, in order to configure the network device. A logical address allowing communication with the configuring device is automatically assigned to the network device, when the network device is connected to the configuring device. Further, network setting including configuration of the configuring device is automatically done such that communication with the network device automatically starts when the configuring device receives an arbitrary character string as an identifier of a network resource and receives an instruction to make an access thereto. Therefore, even if the user does not know the details of how to configure the network device, values of configuration parameters for the network device can be easily specified. Such a configuring means is readily handled not only by users skilled in PC and network techniques but also novice users.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described using a wireless LAN bridge as an example of the network device. Naturally, the device to which the present invention is applicable is not limited to the wireless LAN bridge.

<Overall Operation at the Time of Configuring>

Figure 1:
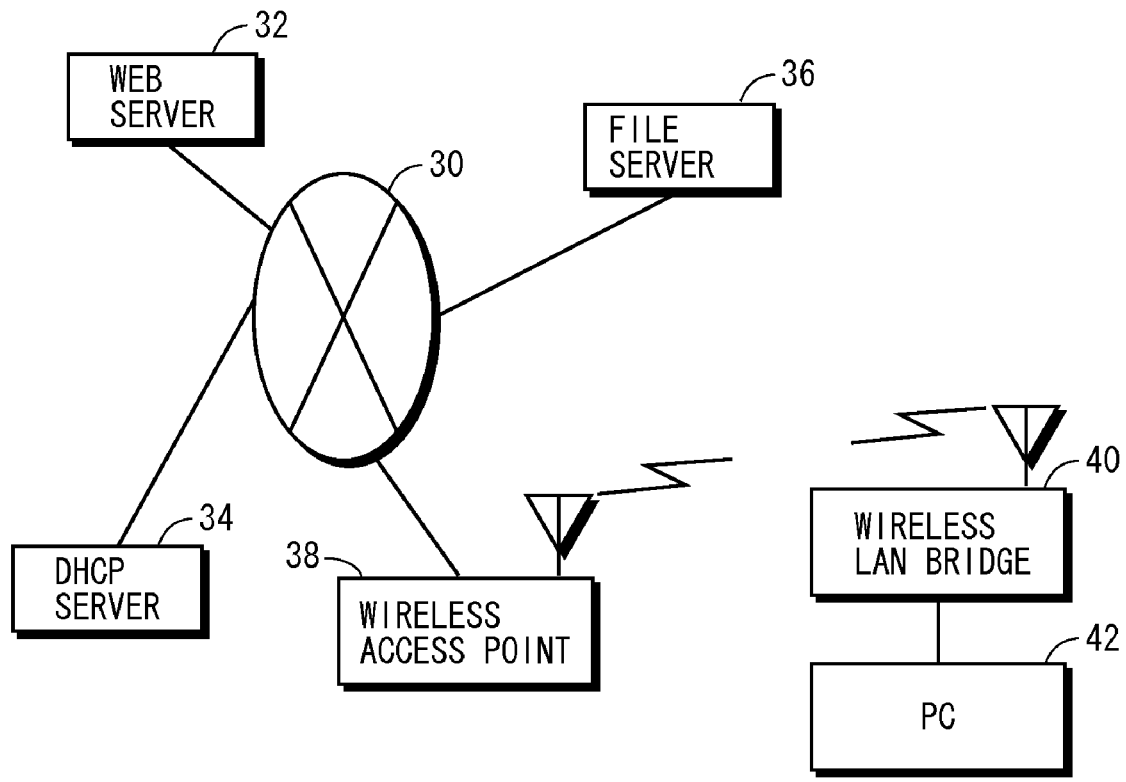
FIG. 1 shows an example of a network environment in which a wireless LAN bridge 40 in accordance with a first embodiment of the present invention is used.

FIG. 1 shows an overall configuration of a network 30 to which a wireless LAN bridge 40 (hereinafter simply referred to as a "bridge 40") as a network device in accordance with the present embodiment is connected. Referring to FIG. 1, a web server 32, a DHCP server 34, a file server 36 and the like are connected to network 30. Further, network 30 includes a wireless LAN access point 38 for wireless connection with bridge 40 and for relaying communication between a device connected to bridge 40, such as a PC 42 and network 30.

FIG. 1 shows a state of network connection after network-related parameters of bridge 40 are configured. In the present specification, an operational mode in which normal communication takes place will be referred to as a "normal operation mode" of bridge 40. An operational mode in which network-related parameters of bridge 40 are configured is referred to as a "configuring mode," In the normal operation mode, it is assumed that bridge 40 operates in the environment as shown in FIG. 1. Immediately after the purchase of bridge 40, however, it is not configured to allow operation in such an environment because it is impossible to expect operational environment at the stage of shipment. Therefore, first, network-related parameters of bridge 40 in accordance with the present embodiment are specified using a user interface of PC 42 in the following manner.

Figure 2:
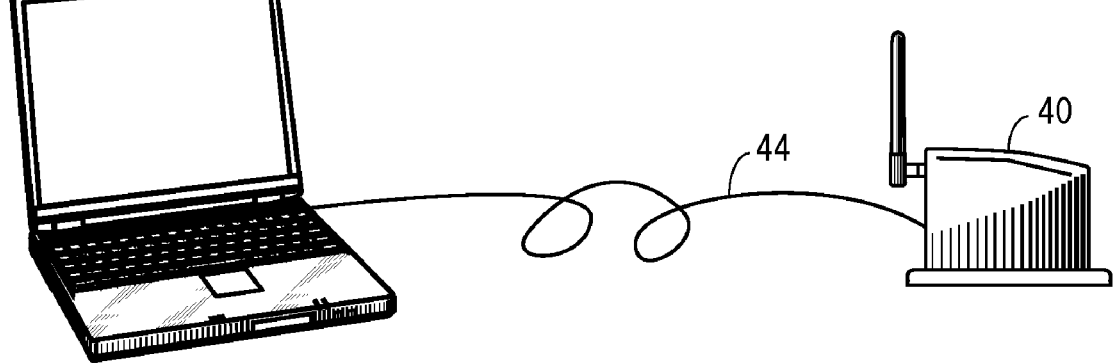
FIG. 2 illustrates a manner of connection at the time of configuring wireless LAN bridge 40.

As shown in FIG. 2, bridge 40 will be connected to PC 42 by a cable 44. Then, operational mode of bridge 40 is switched to the configuring mode and bridge 40 is restarted. Thus, wireless communication function of bridge 40 will be terminated. Specifically, bridge 40 is separated from a network and physically connected only to PC 42. In the following, how the bridge 40 operates dependent on the state of PC 42 will be described. Here, an IP address of PC 42 will be assigned (1) dynamically by a DHCP service or (2) as a fixed address.

Figure 3:
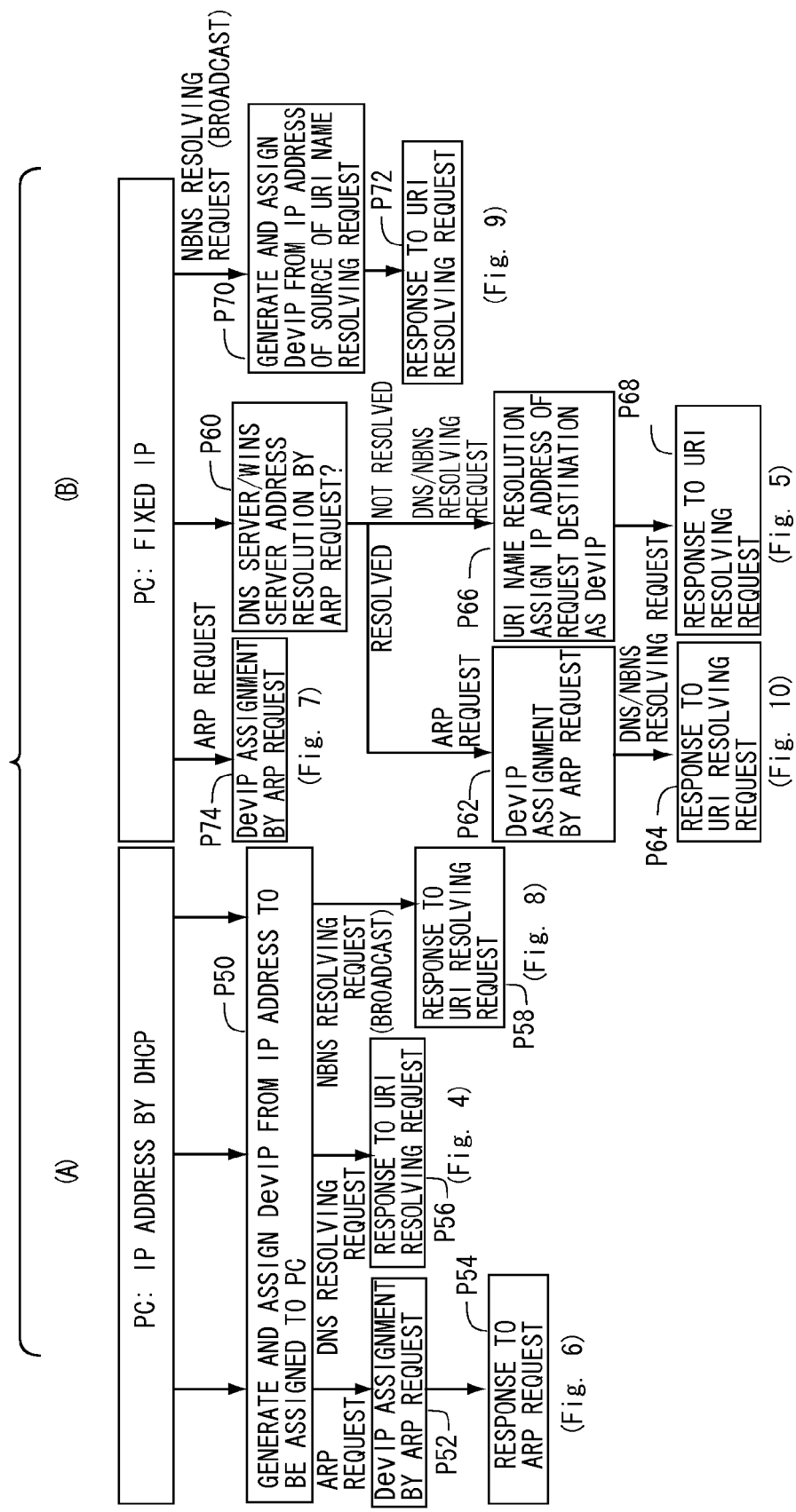
FIG. 3 shows classification of operations when wireless LAN bridge 40 is set by wireless LAN bridge 40 and a PC 42.

Referring to FIG. 3(A), when the IP address of the PC is dynamically assigned by the DHCP service, the processes may fall within one of the following patterns. In the present embodiment, for dynamic IP address assignment, an IP address is first assigned to PC 42 at step P50 and then, an IP address DevIP of bridge 40 is generated from the IP address of PC 42, and assigned to bridge 40. Thereafter, when an ARP (Address Resolution Protocol) request is issued from PC 42, step P52 is carried out and then, the flow goes to step P54. When a DNS (Domain Name Service) resolving request is received, the flow goes to step P56. When a broadcast packet of an NBNS (NetBIOS Name Service) resolving request is received, the flow goes to step P58. These steps will be described later.

Hereinafter, a communication packet will be simply referred to as a "packet." The ARP request is broadcast over the network asking for an MAC address, when the MAC address corresponding to the IP address is unknown. DNS is a system that returns an IP address corresponding to a URI. NBNS functions in a way similar to DNS, on a specific network.

When the IP address of PC 42 is a fixed address, the processes may fall within one of the following patterns. Referring to FIG. 3(B), for the fixed address, whether a MAC address resolution of a DNS server or an NBNS server address is necessary or not is determined at step P60. The process at PC 42 branches dependent on the result. If resolution is necessary, PC 42 issues an ARP request, and the process goes from step P62 to P64. If resolution is unnecessary, a URI resolution request of DNS/NBNS server will be issued from PC 42, and then, the process goes through step P66 to P68. When a name resolution request of NBNS is broadcast from PC 42, the process from step P70 to step P72 is carried out. Further, when PC 42 issues an ARP request, the process of step P74 is carried out. Each of the process steps will be described below.

Figure 4:
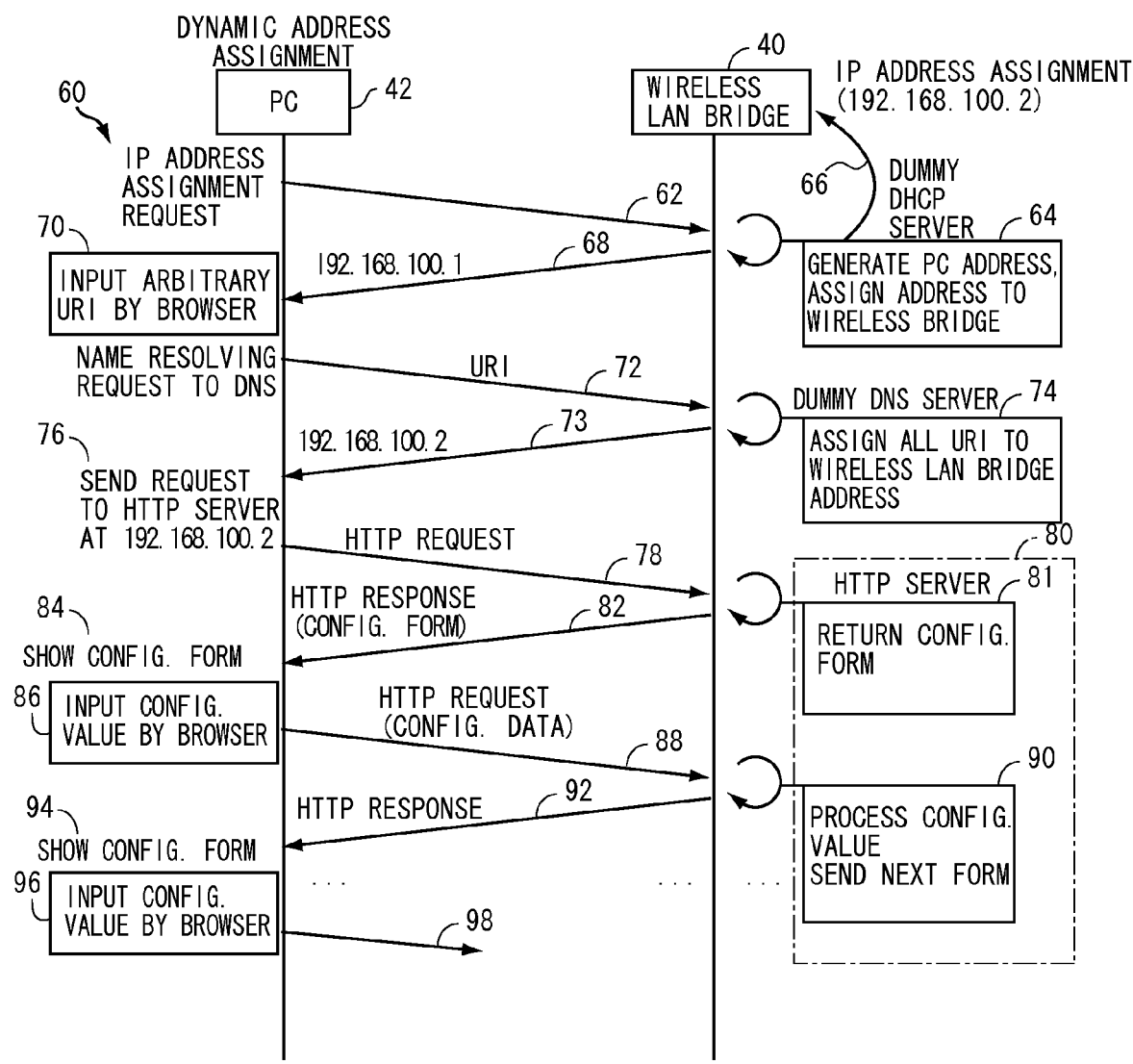
FIGS. 4 to 10 show sequences related to communication between wireless LAN bridge 40 and PC 42 at the time of configuring wireless LAN bridge 40.

FIG. 4 shows a communication sequence between PC 42 and bridge 40, when the IP address of PC 42 is dynamically assigned by DHCP. The communication sequence corresponds to the case of process steps P50 and P56 in FIG. 3.

Referring to FIG. 4, in the configuring mode, a simplified DHCP server 64, a simplified DNS server 74, a simplified NBNS server (not shown in FIG. 4) and an HTTP server 80 will be activated in bridge 40. Here, the IP address is not assigned to bridge 40. Simplified DHCP server 64 will be running only in the configuring mode and its function is quite limited, different from a common DHCP server. Therefore, in the following, the simplified DHCP server will be referred to as a "dummy DHCP server." When receiving any name resolving request naming a URI, simplified DNS server 74 returns the IP address of bridge 40, to any name resolving request naming a URI, as the IP address corresponding to the URI, regardless of the URI. Thus, simplified DNS server 74 is different from a common DNS server. Therefore, in the following, the simplified DNS server 74 will be referred to as a "dummy DNS server." Similarly, the simplified NBNS server is referred to as a "dummy NBNS server." Though the IP address of bridge 40 is not determined at the start of the configuring mode, it will be first determined in the manner as will be described later. Further, in the configuring mode, an ARP response function (not shown in FIG. 4) will be also running on bridge 40 to provide for a specific case that will be described later. This ARP response function is a simplified version of the original ARP response function as will be described later, and hence the ARP function server will be referred to as a "dummy ARP server" in the present embodiment.

At the start of the configuring mode, an IP address assignment request 62 (hereinafter referred to as "DHCP request") will be issued from PC 42 to dummy DHCP server 64 (60). DHCP request 62 is broadcast. When an IP address has been assigned to PC 42 by a common DHCP server (not shown in FIG. 4), the DHCP request 62 will be a re-assignment request for the IP address. In this case, bridge 40 transmits a NACK packet (error notice) to PC 42. Receiving the NACK packet, PC 42 sets its IP address to 0.0.0.0 and then, issues a DHCP request 62 again. Details of the process at this time will be described with reference to FIG. 15. Here, broadcasting is used, so that bridge 40 can receive DHCP request 62, even though it does not have any IP address assigned thereto.

In response to a DHCP request 62, dummy DHCP server 64 generates an IP address (such as 192.168.100.1) in accordance with a predetermined scheme. Bridge 40 sends the generated IP address to PC 42 as a DHCP response 68. As a result, the IP address of PC 42 is set to that address.

At this time, dummy DHCP server 64 automatically generates an IP address of bridge 40 from the IP address assigned to PC 42 and assigns the generated IP address to bridge 40 (66), and inserts the same in DHCP response 68. DHCP response 68 includes not only the IP address of PC 42 but also a DNS server address and a default gateway address, which are both the address of bridge 40. By this approach, it becomes possible to receive a request to the default gateway and a DNS name resolving request from PC 42 at bridge 40. A simple algorithm may be used for generating the IP address. By way of example, a constant (for example, 1) may be added to the last figure of the IP address assigned to PC 42, and the result may be used as the IP address of bridge 40. When the IP address assigned to PC 42 equals to a reserved address such as "192.168.100.1," then the IP address of bridge 40 may be changed to "192.168.100.2." By determining the IP address of bridge 40 in this manner, it follows that bridge 40 and PC 42 come to belong to the very same network segment. Here, it is necessary to make sure the generated IP address does not overlap any of the reserved address such as a network address or a broadcast address.

After the IP address of PC 42 is determined, the user activates a prescribed browser in PC 42. Here, it is assumed that the user inputs an arbitrary URI to a URI input field of the browser (70). Assuming that the MAC address of DNS server is stored in PC 42, the browser of PC 42 issues a URI name resolving request 72 to the DNS server, so as to obtain an IP address that corresponds to the URI. The name resolving request is received by dummy DNS server 74 of bridge 40. As described above, regardless of the URI in the received name resolving request 72, dummy DNS server 74 returns the IP address of bridge 40=192.168.100.2, as the corresponding IP address (73). This is possible as the IP address has already been assigned to bridge 40.

Receiving a notice of IP address, the browser of PC 42 issues an HTTP request 78 to IP address=192.168.100.2 (76). The destination of HTTP request 78 is the IP address of bridge 40. Therefore, the HTTP request 78 is passed to an HTTP server 80 running on bridge 40. In response to the HTTP request 78, HTTP server 80 returns the first page of the configuring form (HTML (HyperText Markup Language) form) for configuring bridge 40 as an HTTP response 82, to PC 42 (81). Receiving the HTTP response 82, the browser of PC 42 displays this configuring form (84).

The user inputs data for configuring bridge 40 to each field of the configuring form on the browser window of PC 42, and presses an enter key (86). As a result, a new HTTP request 88 including the input configuration data is transmitted from the browser to HTTP server 80. In HTTP server 80 receiving the HTTP request 88, a process designated by the HTTP request 88 (which corresponds to a configuration write task 270 described later) is activated. By this process, the configuration data is written 90 to a prescribed storage area of bridge 40, and then a new configuring form is prepared, which is returned as an HTTP response 92 from HTTP server 80 to PC 42.

Thereafter, the configuring form in accordance with HTTP response 92 is displayed (94) on the browser of PC 42, the user inputs configuration data (96), and the configuration data 98 are transmitted to bridge 40. These steps are repeated until the necessary data are all transmitted to and stored in bridge 40.

In this manner, when PC 42 is configured to have its IP address dynamically assigned by the DHCP server as shown in FIG. 4, it is possible to configure bridge 40 through a browser of PC 42.

Next, referring to FIG. 5, an example will be given in which a fixed IP address has been assigned to PC 42. In this case, generally, the addresses of DNS server and default gateway are also stored in PC 42. Here again, in the configuring mode, dummy DHCP server, dummy DNS server, HTTP server and dummy ARP server will be running on bridge 40. It is noted, however, that the dummy DHCP server and the dummy ARP server are not related to the operation.

Entering the configuring mode, the user activates a browser in PC 42, and inputs an arbitrary URI to the URI input field (70). In response to the input of URI, PC 42 transmits a name resolving request corresponding to the URI to the DNS server. Specifically, PC 42 transmits a name resolving request 110 having the IP address of PC 42 as a source address, an IP address of the DNS as a destination address, and the input URI as the URI of which name is to be resolved. The request will be received by bridge 40.

Bridge 40 applies the request to dummy DNS server 74, regardless of the destination address (DNS address) in the name resolving request 110. First, dummy DNS server 74 assigns the address (for example, 192.168.100.254) of the DNS server included in name resolving request 110 to bridge 40 (75). Then, dummy DNS server 74 assigns the IP address (192.168.100.254) of the bridge 40 to the URI, regardless of the URI in name resolving request 110, and returns the IP address as a response 114 to PC 42.

Receiving the response 114, PC 42 issues an HTTP request 78 to the destination IP address (192.168.100.254) (76). The destination IP address represents bridge 40. Upon receiving HTTP request 78, bridge 40 applies the HTTP request 78 to HTTP server 80. In response to the HTTP request, HTTP server 80 returns a prescribed configuring form as an HTTP response, to PC 42 (81). Then, through similar process steps as in FIG. 4, input of configuring data to bridge 40 is executed. Therefore, detailed description thereof will not be repeated here.

Figure 5:
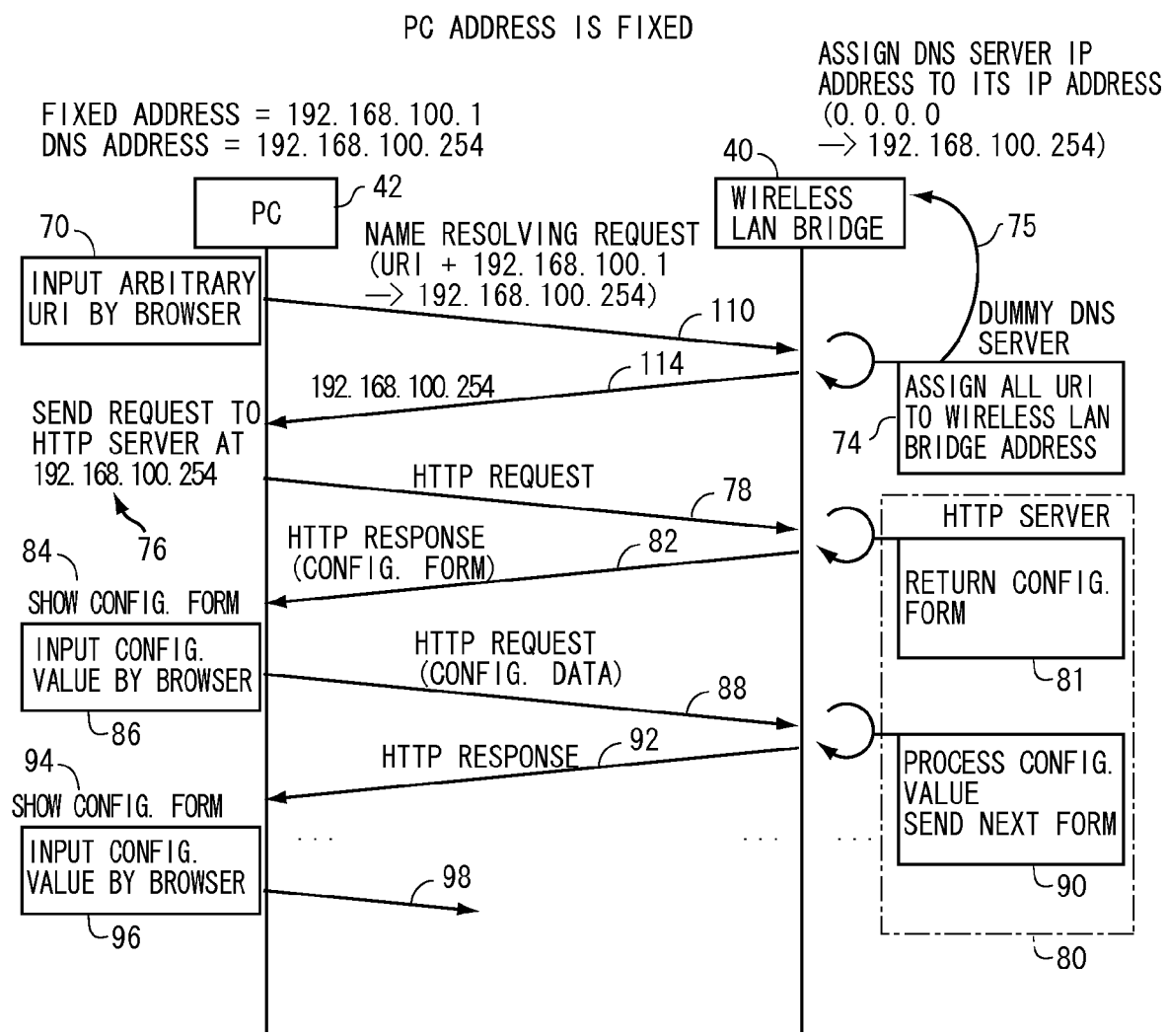
Figure 6:
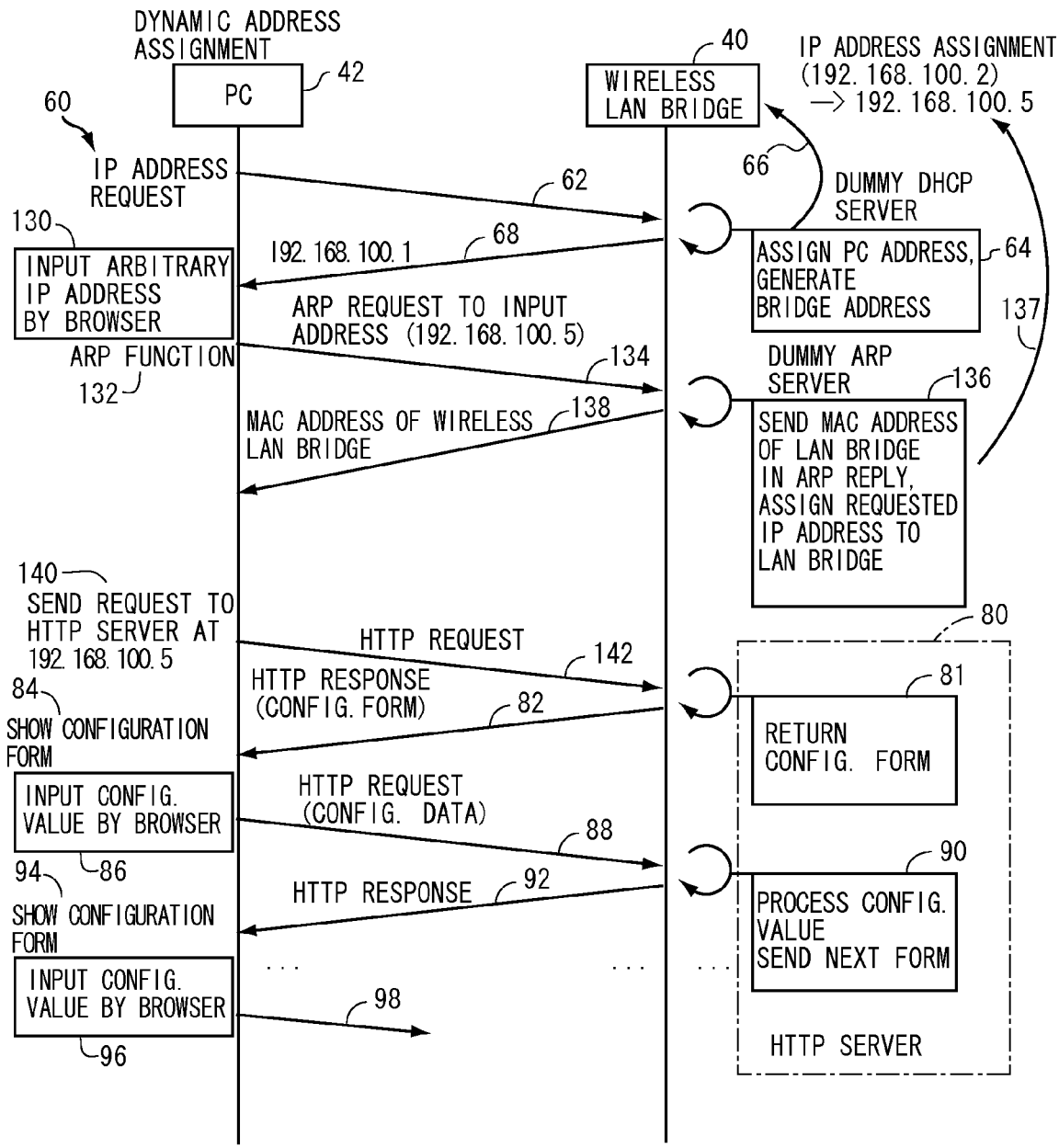

Both in the examples shown in FIGS. 4 and 5, when an arbitrary URI is input by the user to the URI field of the browser, the configuring form of bridge 40 is automatically displayed on the browser. The user may, however, input an IP address in the form of, for example, "http://192.168.100.5," in place of an arbitrary URI. In such a case, generally, the browser transmits not the name resolving request of the IP address but an ARP request, to know an MAC (Media Access Control) address (physical address) that corresponds to the IP address (logical address). The operation in this case will be described with reference to FIGS. 6 and 7. FIG. 6 represents an example in which the user inputs an IP address and not a URI on the browser of PC 42 that has received DHCP response 68, in the example of FIG. 4.

Referring to FIG. 6, when the user inputs an arbitrary IP address (130), an ARP request 134 containing the input IP address is broadcast from PC 42. Upon receiving the ARP request 134, bridge 40 gives the ARP request 134 to dummy ARP server 136. As described above, in the configuring mode, dummy ARP server 136 is running on bridge 40.

Dummy ARP server 136 returns the MAC address of bridge 40 to PC 42 as an ARP reply 138, regardless of the value of IP address in the ARP request 134. Further, dummy ARP server 136 sets the IP address of bridge 40 to that included in ARP request 134 (137). Specifically, the IP address (192.168.100.2) set by dummy DHCP server 64 is reset to 192.168.100.5, by dummy ARP server 136.

Upon receiving the ARP reply 138, the browser of PC 42 transmits an HTTP request 142 including the IP address input by the user and the MAC address in ARP reply 138 to bridge 40 (140). As the MAC address contained in the HTTP request 142 matches the MAC address of bridge 40, bridge 40 interprets that the HTTP request 142 is addressed to itself, and passes the HTTP request 142 to HTTP server 80. HTTP server 80 transmits the configuring form to PC 42 (81). Thereafter, as in the examples of FIGS. 4 and 5, configuring data for PC 42 are input, using PC 42. In the example of FIG. 6, the destination IP address of the HTTP request from PC 42 to bridge 40 is the arbitrary IP address first input (130) by the user.

Figure 7:
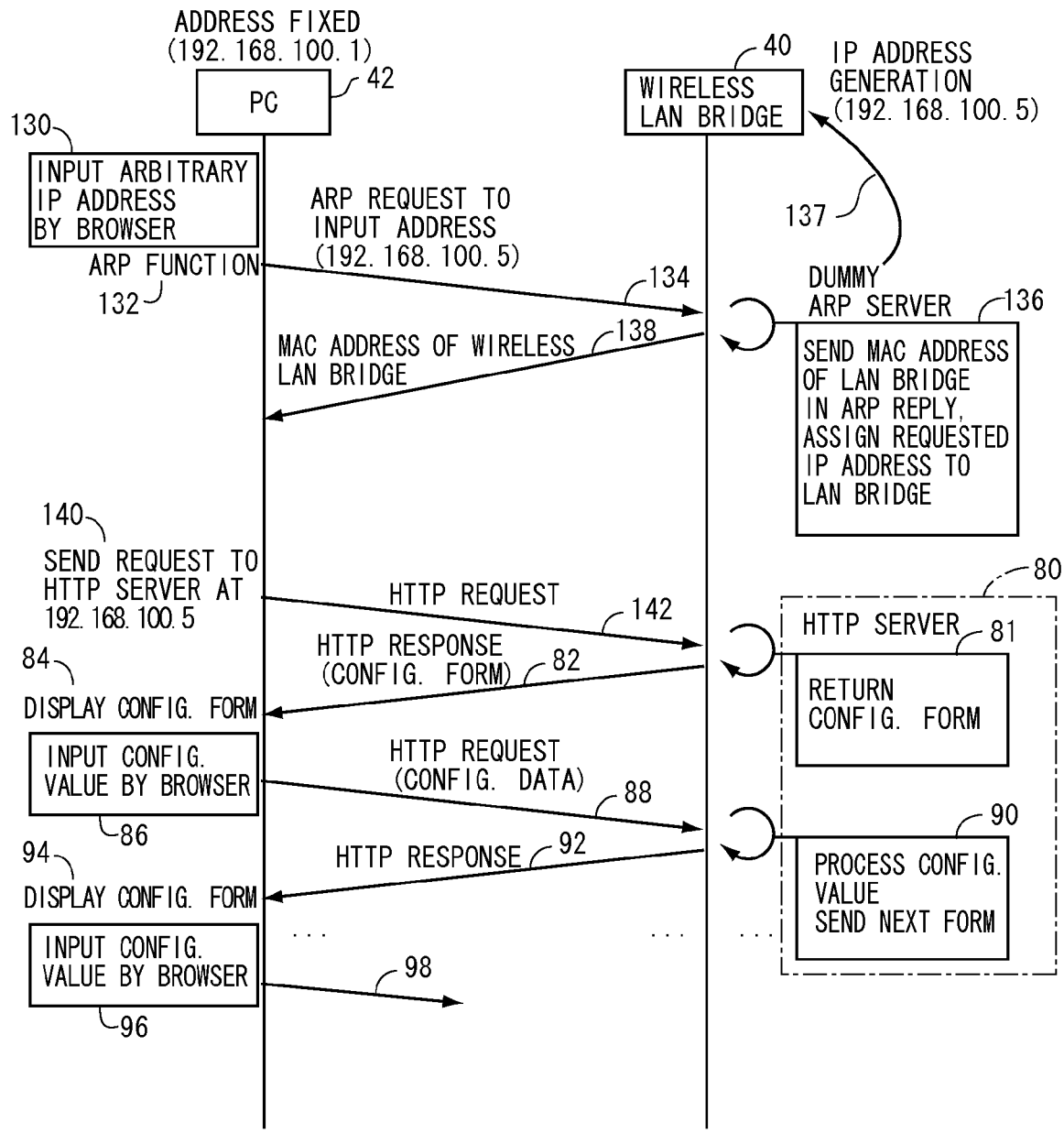

FIG. 7 represents an operation sequence of PC 42 and bridge 40 when the user directly inputs an IP address, in place of an arbitrary URI in the example of FIG. 5. Referring to FIG. 7, the operation sequence is different from that of FIG. 6 in that the first DHCP assignment request 62 and the corresponding communication of DHCP response 68 are not included. Except for these points, FIG. 7 is the same as the operation sequence of FIG. 6, and therefore, detailed description thereof will not be repeated here.

Figure 8:
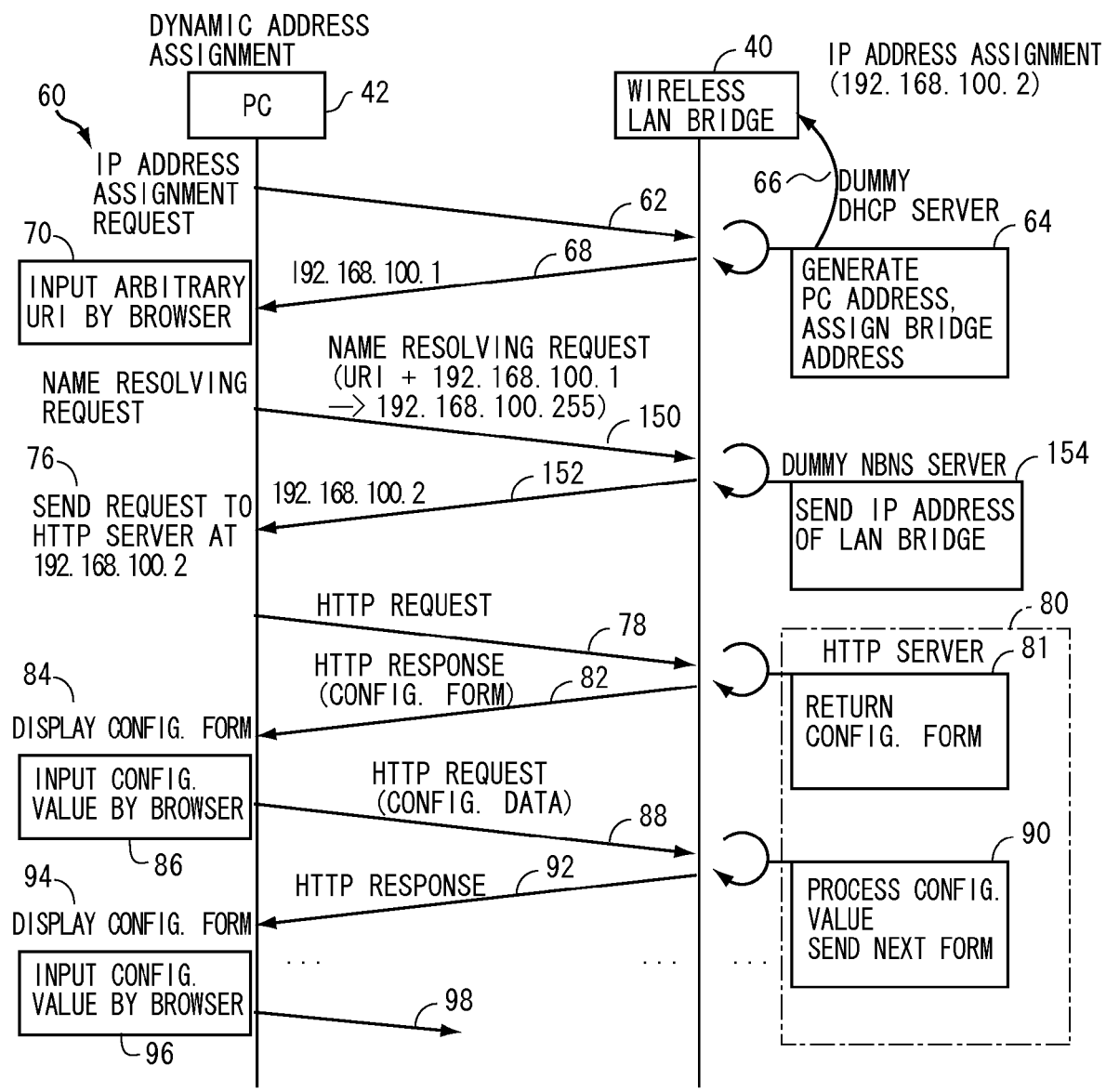
Figure 9:
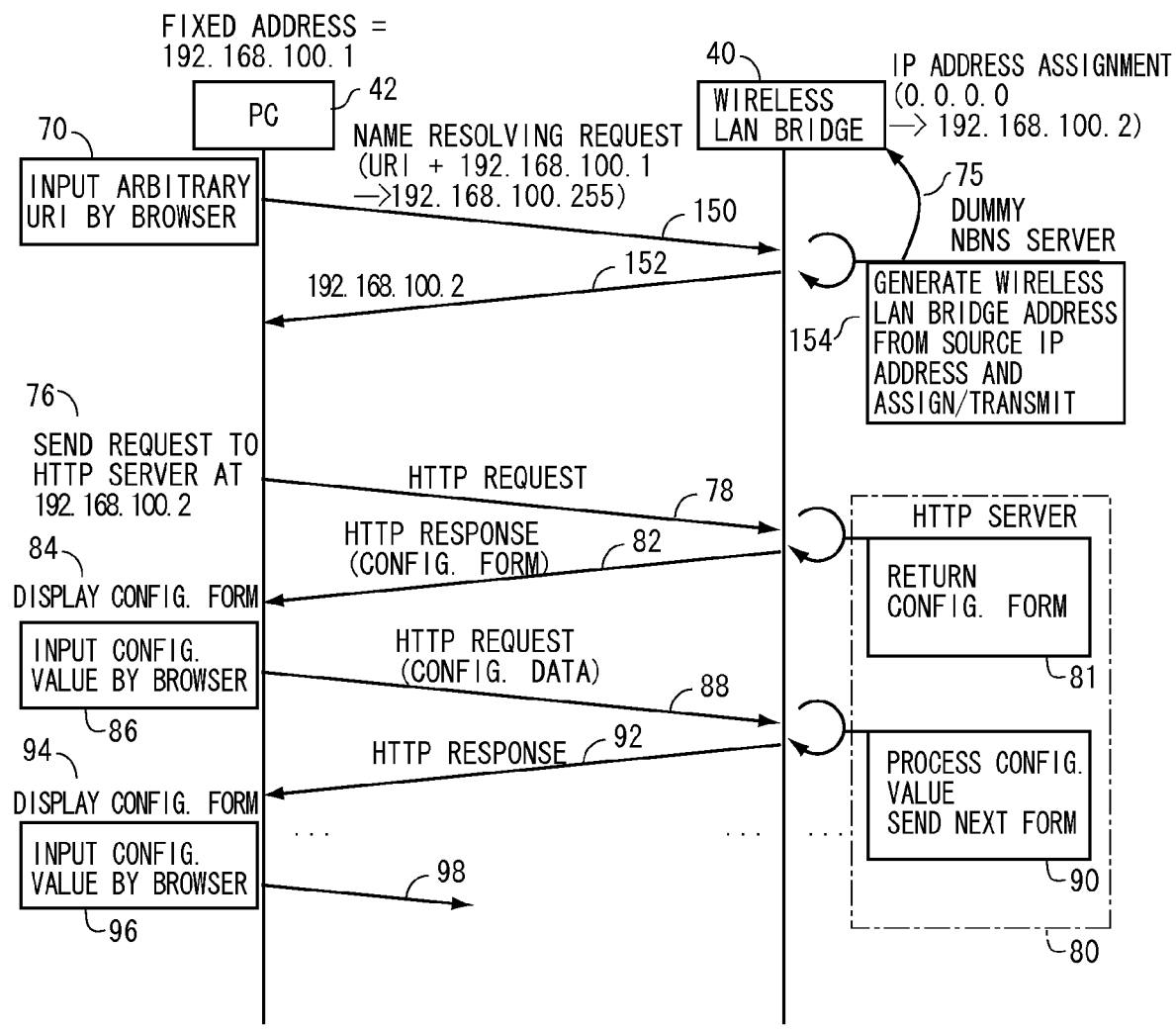

As already described, some PCs are set to broadcast not the DNS name resolving request but an NBNS name resolving request. A communication sequence for such configuration will be described with reference to FIGS. 8 and 9. FIG. 8 shows a sequence corresponding to the example of FIG. 4, in which not the DNS name resolving request but an NBNS name resolving request is issued. FIG. 9 shows a sequence corresponding to the example of FIG. 5, in which the NBNS name resolving request is issued.

As can be seen from the comparison between FIGS. 8 and 4, PC 42 broadcasts an NBNS name resolving request 150 in place of URI name resolving request of FIG. 4. NBNS name resolving request 150 stores a URI as an object of name resolution and the IP address (for example, 192.168.100.1) of PC 42. As the NBNS name resolving request is broadcast, the destination IP address is 192.168.100.255.

Upon receiving NBNS name resolving request 150, bridge 40 passes the request to dummy NBNS server 154. Dummy NBNS server 154 generates an IP address (for example, 192.168.100.2) of bridge 40 by adding 1 to the last figure of the IP address of the transmission source included in the received broadcast packet, and returns an NBNS response packet 152 including the generated IP address to PC 42.

Upon receiving the NBNS response packet 152, PC 42 regards the IP address=192.168.100.2 contained in NBNS response packet 152 as the IP address corresponding to the URI input at step 70, and transmits an HTTP request 78 using the IP address 192.168.100.2 as the destination. The IP address is that of bridge 40, and therefore, bridge 40 receives the HTTP request 78, and passes it to HTTP server 80 running on bridge 40. Thereafter, in the similar manner as in the example of FIG. 4, bridge 40 can be configured through PC 42.

In contrast, in the example of FIG. 9, IP address of PC 42 is fixed. Therefore, communication corresponding to the IP address assignment request 62 and DHCP response 68 of FIG. 8 will not take place.

When the IP address of PC 42 is fixed and the IP address of DNS is also set (FIG. 5), the MAC address corresponding to the IP address of DNS may be lost from the MAC address table of PC 42. In such a case, the MAC address corresponding to the IP address of DNS is to be obtained before the issuance of name resolving request packet for the DNS upon reception of URI input. A communication sequence in this situation will be described in the following.

Figure 10:
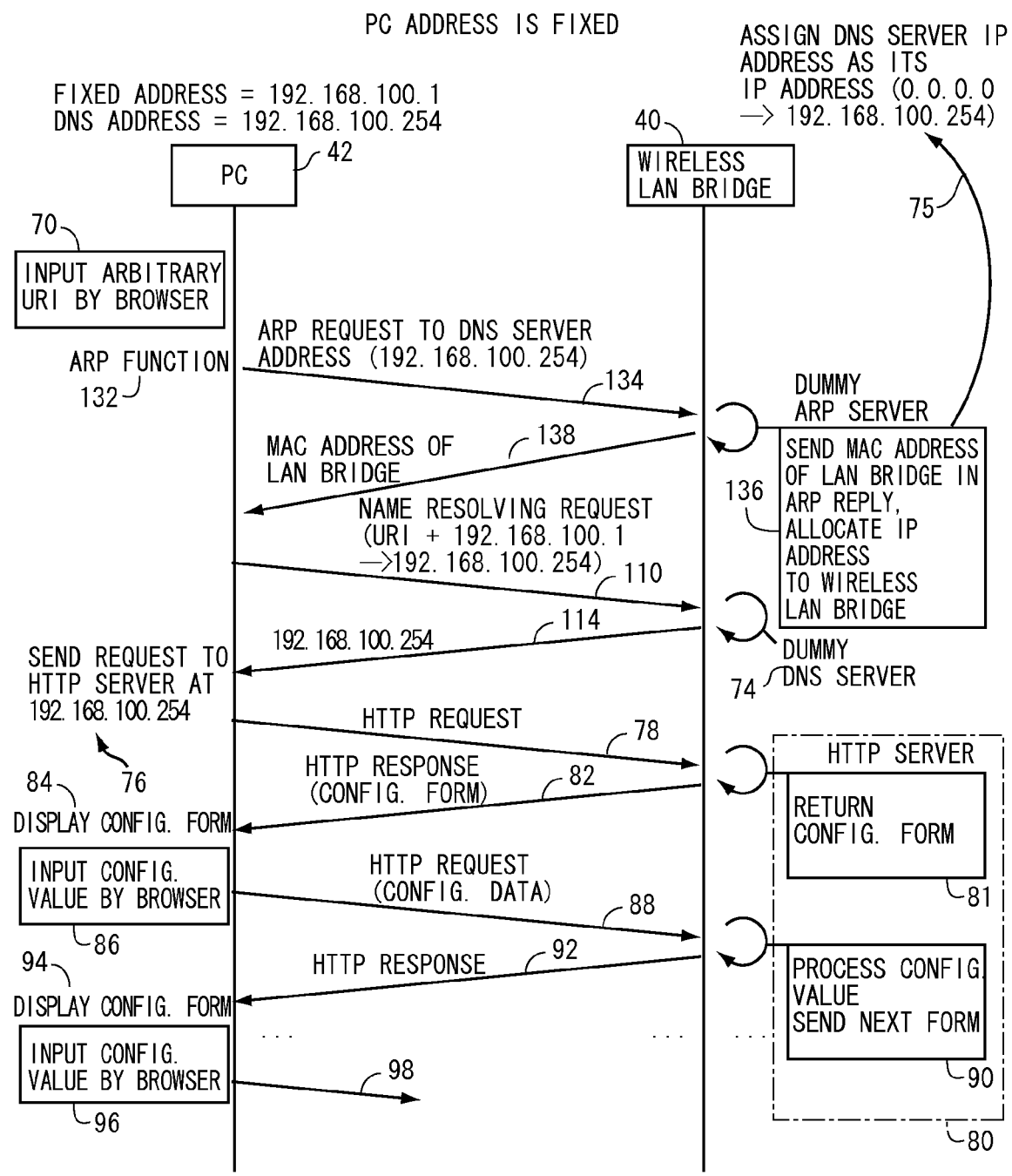

Referring to FIG. 10, an example will be described in which the IP address of DNS server is set in PC 42 while the MAC address has been lost from the MAC address table of PC 42, when an arbitrary URI is input at the process step 70 of FIG. 5. By way of example, let us assume that the IP address of PC 42 is 192.168.100.1 and that of DNS server is 192.168.100.254.

Here, though a name resolution request should be transmitted to the DNS server, corresponding MAC address is still unknown. Therefore, first, PC 42 broadcasts an APR request 134 related to the IP address=192.168.100.254 of the DNS. Receiving the ARP request 134, dummy ARP server 136 of bridge 40 configures the bridge 40 so that its IP address is set to the DNS server address (192.168.100.254) stored in the ARP request 134 (75), and transmits the MAC address of bridge 40 as the MAC address that corresponds to the transmitted IP address, as an ARP reply 138 to PC 42.

Upon receiving the ARP reply 138, PC 42 transmits the name resolving request 110 for the URI input at step 70, to the IP address=192.168.100.254. Receiving the name resolving request, bridge 40 passes the request to dummy DNS server 74.

After name resolution for the URI included in name resolving request 110, Dummy DNS server 74 transmits a response 114 to PC 42 including the IP address=192.168.100.254 of bridge 40 itself as the resolved IP address. The sequence thereafter is the same as that shown in FIG. 5, and as a result, bridge 40 can be configured through PC 42.

<Structure>

Figure 11:
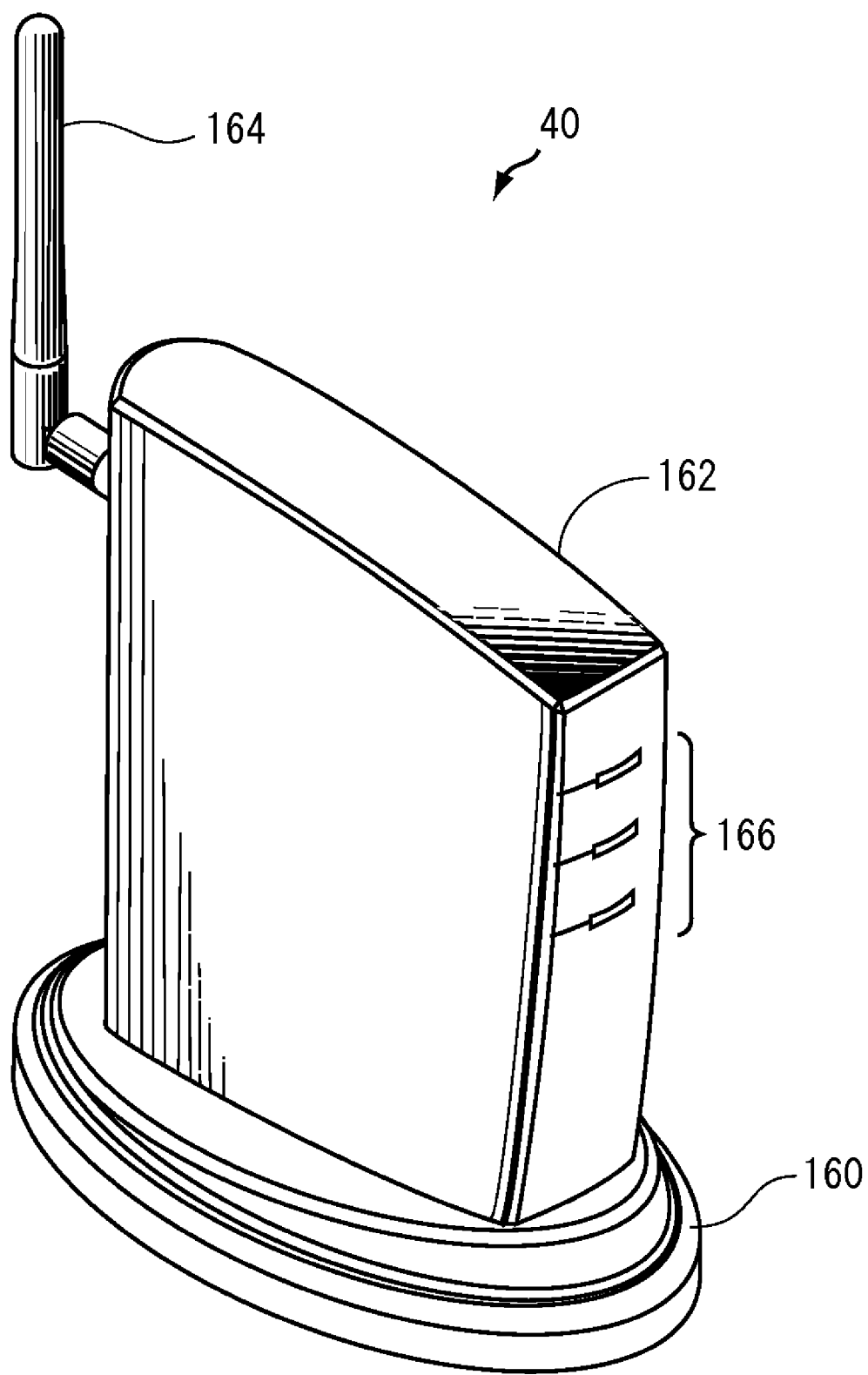
FIG. 11 is a perspective view showing an appearance of wireless LAN bridge 40 in accordance with an embodiment of the present invention.

In the following, a structure of bridge 40 will be described, so as to clarify what functions are provided in bridge 40 to realize the operations described above. FIG. 11 is a perspective view of bridge 40 in accordance with the present embodiment, and FIG. 12 is a rear view thereof.

Referring to FIG. 11, bridge 40 includes a base 160 and a housing 162 mounted on base 160 and holding a circuitry therein, which will be described later. On a front surface of housing 162, LEDs (Light Emitting Diodes) 166 are provided. LEDs 166 are used to indicate whether bridge 40 is in normal operation mode or configuring mode, to indicate state of operation of bridge 40 in the normal operation mode, or to indicate an error state of bridge 40 in the configuring mode.

Figure 12:
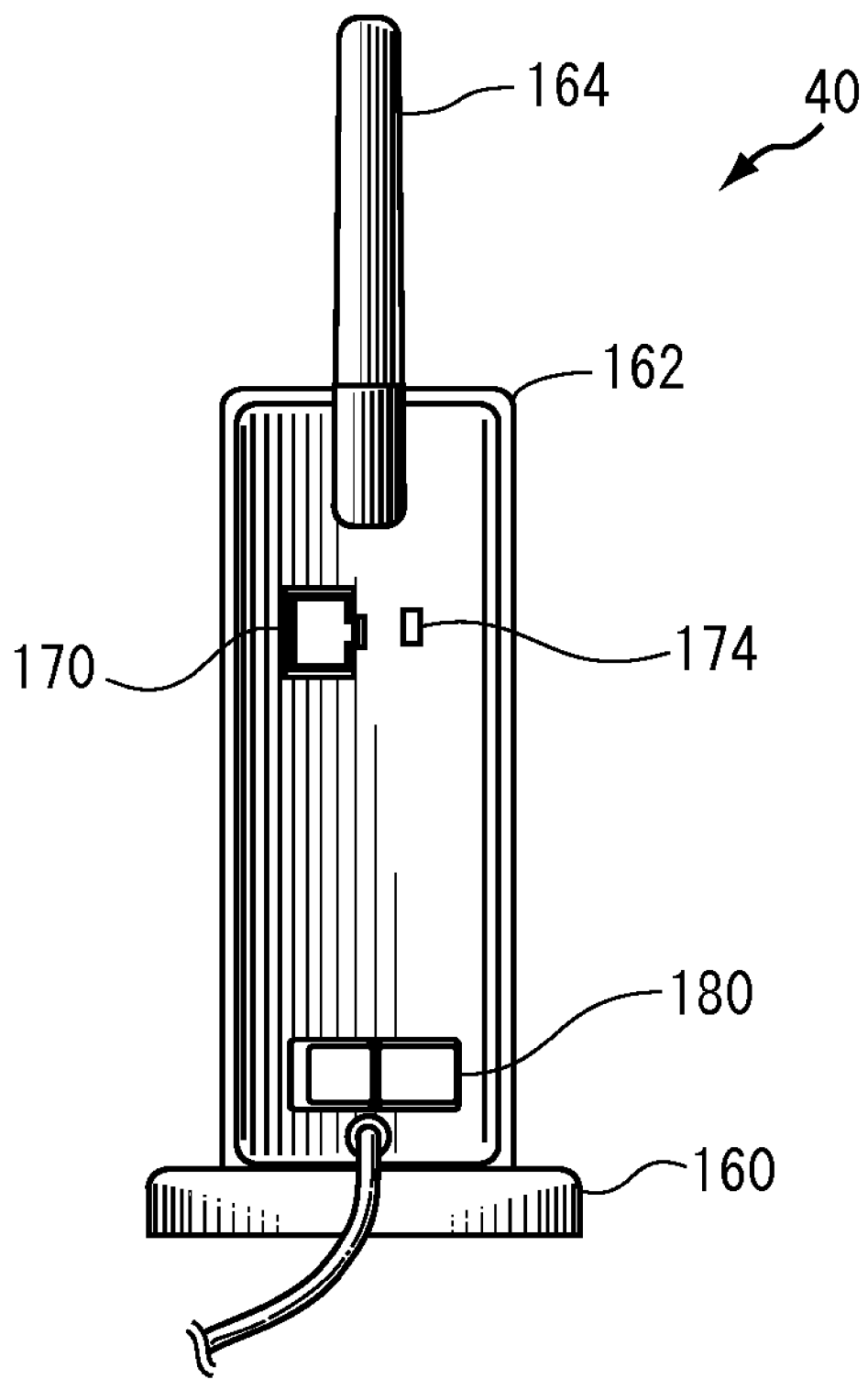
FIG. 12 is a rear view of wireless LAN bridge 40.

Referring to FIGS. 11 and 12, on an upper portion of the rear surface of housing 162, an antenna 164 for wireless LAN is provided. Further, on a lower portion of the rear surface of housing 162, a power switch 180 is provided.

On the rear surface of housing 162, a network cable connector 170 is further provided. Wireless LAN bridge 40 has a bridge function connecting a wireless network and a wired network. In the present embodiment, in the configuring mode, PC 42 is connected to connector 170.

On the rear surface of housing 162, a push switch 174 operated by the user when bridge 40 is to be set to the configuring mode, is provided close to connector 170. In the present embodiment, in order to prevent erroneous operation of push switch 174, bridge 40 is adapted to be re-booted only when push switch is kept pressed for more than a prescribed time period (for example, 5 seconds or longer), to start the operation in the configuring mode. Further, when power switch 180 is once turned off and then turned on again, bridge 40 starts operation in the normal operation mode.

Figure 13:
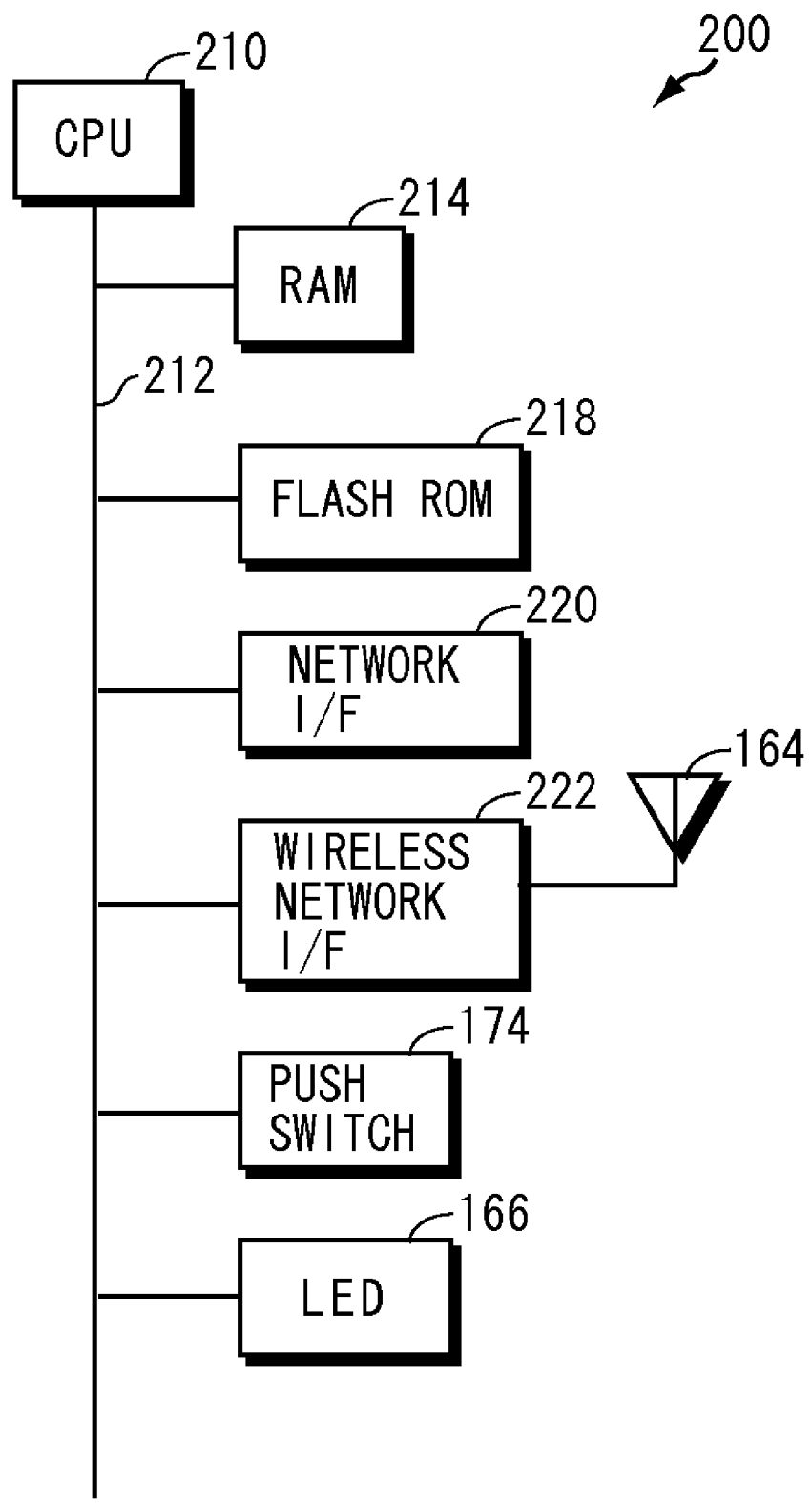
FIG. 13 is a block diagram showing a circuit configuration of wireless LAN bridge 40.

FIG. 13 is a block diagram representing a circuit 200 for realizing the bridge function, housed in housing 162 of bridge 40. Referring to FIG. 13, circuit 200 is substantially the same as a computer, and it includes a CPU (Central Processing Unit) 210 realizing functions of various dummy servers in the configuring mode and the network function and the like in the normal operation mode, by executing prescribed programs, a bus 212 connected to CPU 210, and a RAM (Random Access Memory) 214 used as a work area and the like (including a configuring mode flag, which will be described later) by the computer programs, a flash ROM 218 storing the computer programs and various parameters set by PC 42, a network interface (hereinafter "interface" will be simply denoted by "I/F") 220 having connector 170, and a wireless network I/F 222, all connected to bus 212. To bus 212, push switch 174 and LEDs 166 shown in FIGS. 12 and 11, respectively, are also connected, allowing access to/from an input/output port of CPU 210 through bus 212. CPU 210 sets the state of itself by reading parameters stored in flash ROM 218 in the normal operation mode, to realize a normal network function.

Figure 14:
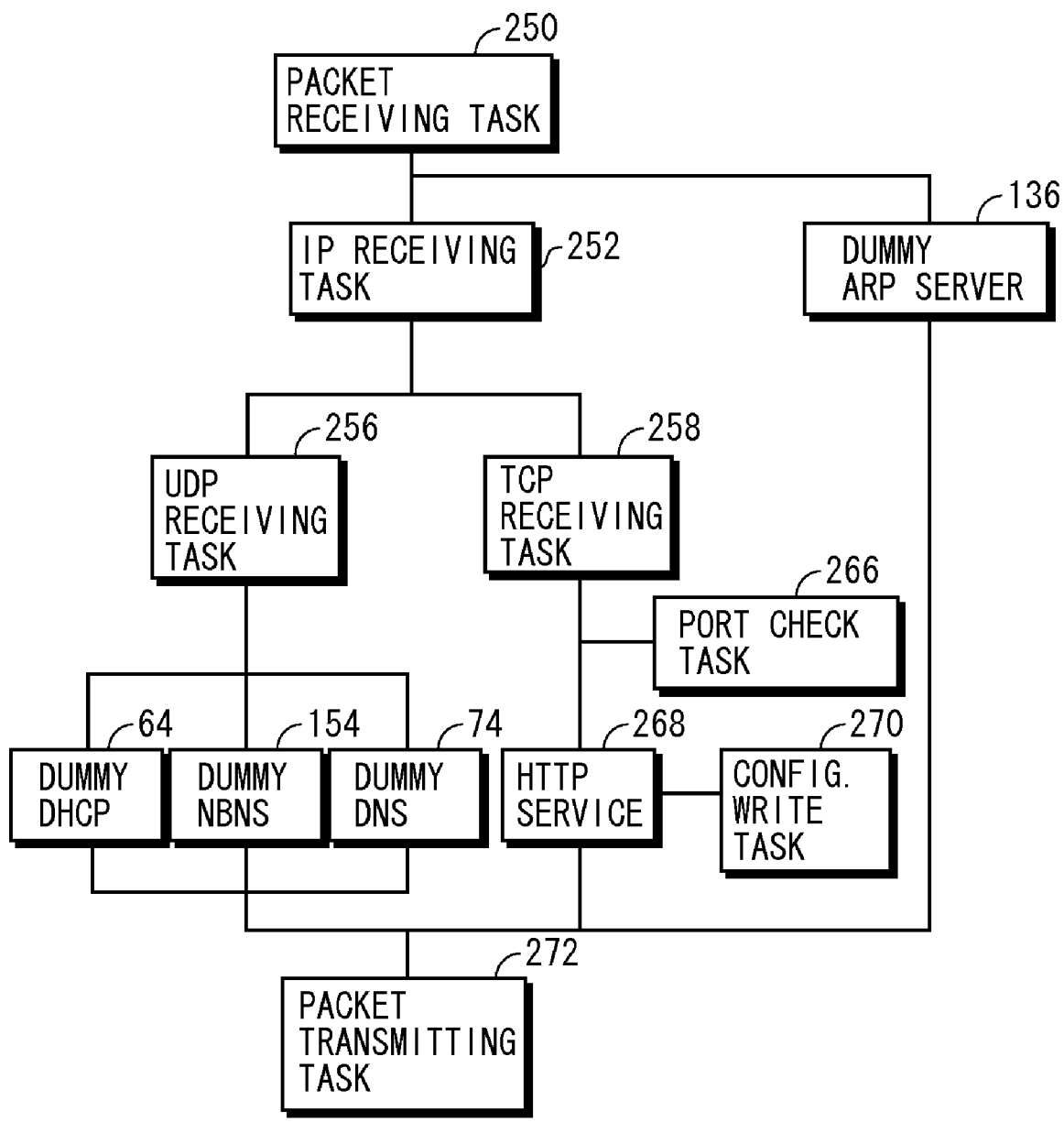
FIG. 14 is a block diagram showing a software configuration of wireless LAN bridge 40.

FIG. 14 shows, in the form of a block diagram, arrangement of a program prepared in bridge 40 for realizing the above-described operations in the configuring mode of bridge 40. Referring to FIG. 14, bridge 40 executes a packet receiving task 250 for receiving packets arriving at wireless LAN bridge through network I/F 220 and wireless network I/F 222 and distributing the packets to appropriate tasks in accordance with packet types, an IP receiving task 252 for receiving IP packets from packet receiving task 250 and distributing the packets to appropriate protocol processing tasks in accordance with the IP packet types, and a UDP receiving task 256 for receiving a UDP (User Datagram Protocol) packet among the IP packets from IP receiving task, and distributing packet data to an appropriate service program in accordance with the packet types.

Further, those programs running on bridge 40 include: a dummy DHCP server 64 having functions of receiving a packet data of a DHCP request from UDP receiving task 256, assigning an IP address to the source PC of the packet in accordance with a prescribed scheme, and performing conversion on the IP address in accordance with a prescribed algorithm to generate an IP address of the bridge 40; a dummy NBNS server 154 having functions of receiving a packet data of an NBNS name resolving request from UDP receiving task 256, and returning the IP address of bridge 40 as the corresponding IP address, regardless of the URI in the packet data; and a dummy DNS server 74 having similar functions of receiving a packet data of a DNS name resolving request from UDP receiving task 256, and returning the IP address of bridge 40 regardless of the URI in the packet data.

As described above, both dummy DNS server 74 and dummy NBNS server 154 have functions of generating an IP address when a name resolving request is received while the IP address of bridge 40 is not yet set, and assigning the IP address to bridge 40.

The programs running on bridge 40 further include a TCP receiving task 258 that receives TCP packets from IP receiving task 252 and passes the packet data to appropriate service daemons in accordance with the packet types; an HTTP service 268 that functions as an HTTP server, receives the HTTP request from TCP receiving task 258, performs an appropriate process for configuring bridge 40, and returns the HTTP response; a configuration write task 270 accessible from HTTP service 268, that configures bridge 40 based on configuring data contained in the received HTTP request; and a port check task 266 that replaces the port numbers other than "80" of the HTTP requests passed from TCP receiving task 258 to HTTP service 268, to "80," so as to allow processing at HTTP service 268. Details of the port check task 266 will be described later.

The programs running on bridge 40 further include a dummy ARP server 136 that configures bridge 40 so that its IP address is set to that named in the ARP request received by packet receiving task 250 as described with reference to FIGS. 6, 7 and 10, generates an ARP reply 138, and notifies the MAC address of bridge 40 to PC 42 for every IP address in the ARP requests; and a packet transmitting task 272 that transmits packets generated by dummy DHCP server 64, dummy NBNS server 154, dummy DNS server 74, HTTP service 268 and dummy ARP server 136 to PC 42.

Among various tasks shown in FIG. 14, functions of tasks 250, 252, 256 and 258 are all very simple. Specifically the general function is to determine the type of the packet by checking a header of a received packet or a packet passed from a task of higher order, and to pass the packet data to an appropriate task.

Functions of dummy ARP server 136, dummy DHCP server 64, dummy NBNS server 154 and dummy DNS server 74 are as described above. Program structure of dummy DHCP server 64 and dummy DNS server 74 will be described later with reference to FIGS. 15 and 16. The function of dummy NBNS server 154 is almost the same as that of dummy DNS server 74, of which program configuration will be described with reference to FIG. 21.

The function of dummy ARP server 136 is as described above with reference to FIG. 6, and its program control structure will be described later with reference to FIG. 20.

The functions of HTTP service 268 is the same as those of a common HTTP service. HTTP service 268 is used by configuration write task 270 for transmitting the configuring form to PC 42 for configuring bridge 40 to PC 42, or for configuring network I/F 220 (FIG. 13) based on the configuration data from PC 42.

As is usually the case, HTTP service 268 in this embodiment is configured to process a packet with a port number "80." Dependent on the settings of a PC, an HTTP request may be transmitted with a port number (for example "8080") other than "80." Port check task 266 replaces the port numbers other than "80" to "80," so that the request can be processed by HTTP service 268.

Figure 15:
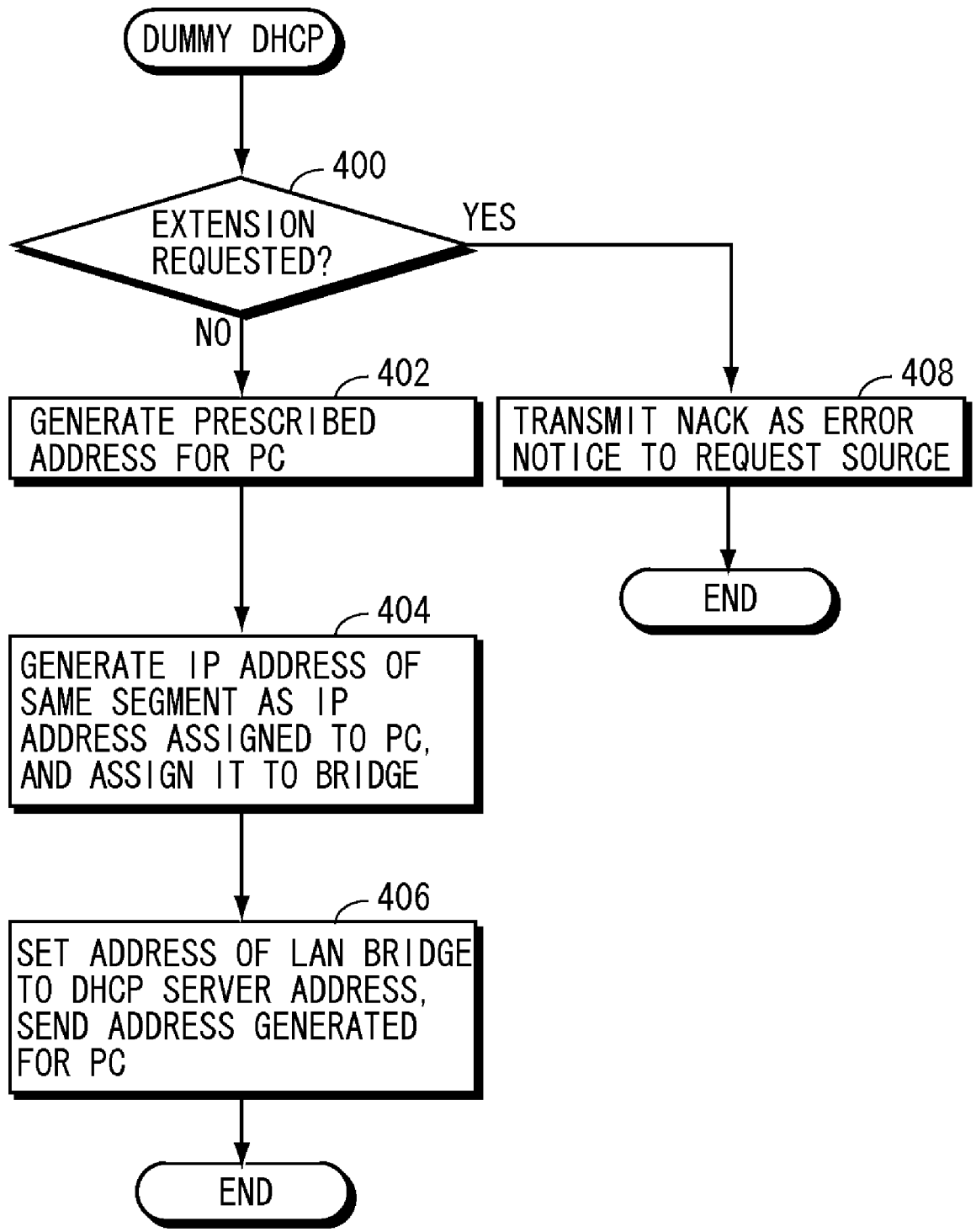
FIG. 15 is a flowchart representing a control structure of a dummy DHCP program.

FIG. 15 is a flowchart representing a program control structure for implementing dummy DHCP server 64 of FIG. 14. The program is activated when wireless LAN bridge starts its operation in the configuring mode, and carries out the following processes upon reception of the DHCP request.

First at step 400, whether the received DHCP request requests re-assignment (extended assignment) of an IP address that has already been assigned by DHCP or not is determined. This is a process for determining whether or not PC 42 was used in other network where IP address was dynamically assigned by DHCP service. If the result is YES, the flow goes to step 408, and if it is NO, the flow goes to step 402.

At step 402, a prescribed IP address for example, 192.168.100.1) is generated for PC 42 that has transmitted the DHCP request, and the flow goes to step 404. On the other hand, at step 408, a NACK packet is transmitted as an error notice to the transmission source of the received DHCP request, and the process for the request is terminated. Receiving the NACK packet, PC 42 once clears its IP address to 0.0.0.0 and then, transmits an IP address assignment request again. The process thereafter in dummy DHCP server 64 is the same as that carried out when a DHCP request for a new IP address is received.

At step 404, in accordance with a prescribed algorithm and the IP address generated at step 402, an IP address (for example, 192.168.100.2) of bridge 40 is generated, and is assigned to bridge 40. At step 406, the IP address of bridge 40 generated at step 404 is set as the address of the DHCP server, the address assigned to PC 42 is transmitted as DHCP response to PC 42, and the process for the request is terminated.

Through the above-described processes, assignment of the IP address to bridge 40 and assignment of the IP address to PC 42 can be implemented, when a DHCP request is issued from PC 42 to bridge 40.

Figure 16:
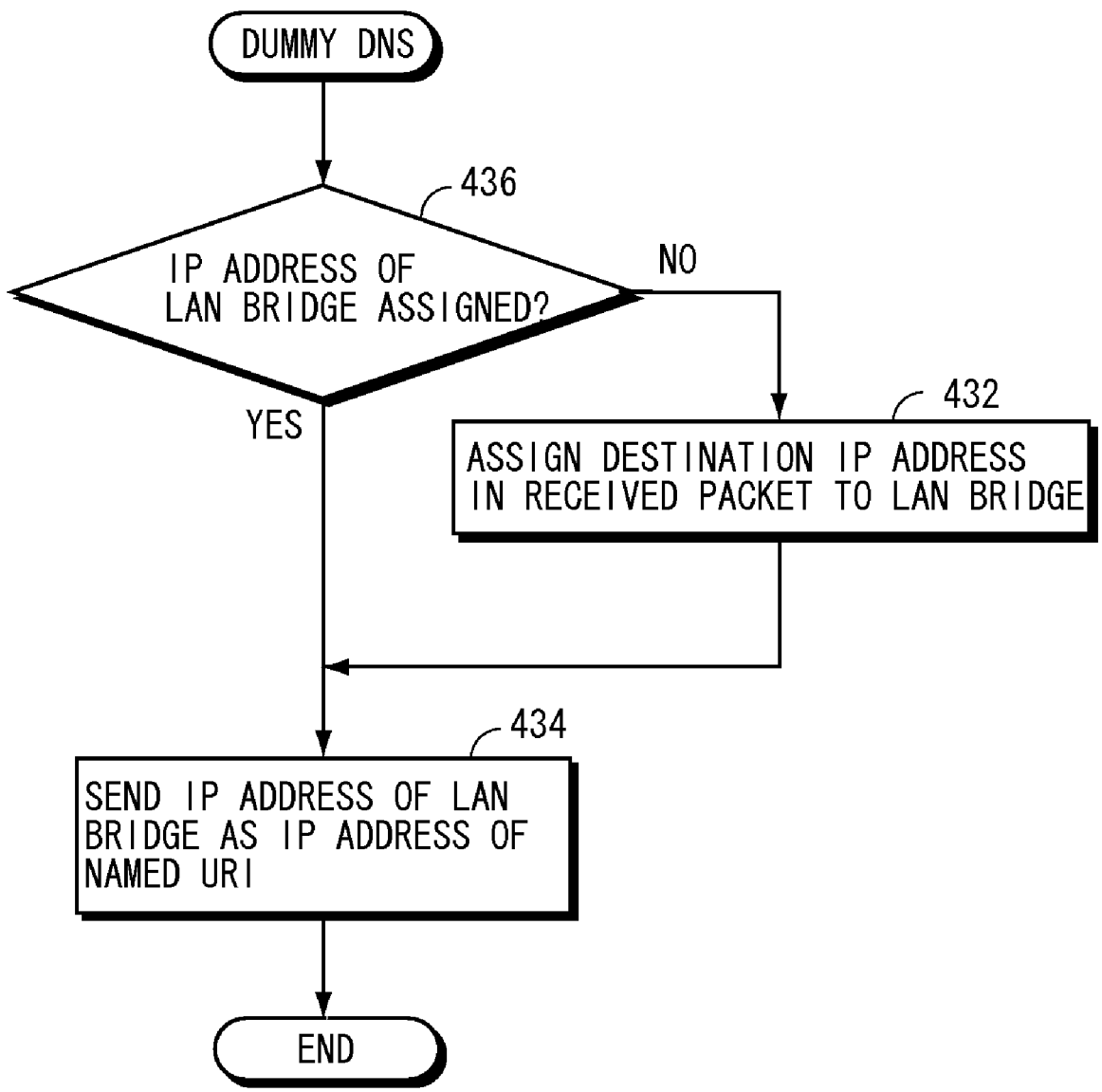
FIG. 16 is a flowchart representing a control structure of a dummy DNS program.

FIG. 16 shows, in the form of a flowchart, a program control structure for realizing dummy DNS server 74 of FIG. 14. The program is activated when bridge 40 enters the configuring mode, and carries out the following process every time a DNS name resolving request is received.

Referring to FIG. 16, at step 436, whether an IP address of bridge 40 has already been assigned or not is determined. If an IP address has not yet been assigned, at step 432, a transmission destination IP address of the received packet is assigned to bridge 40, and the flow goes to step 434. If it has already been assigned, the flow directly goes to step 434.

At step 434, the IP address of bridge 40 is returned to the transmission source of the DNS request. The returned address is regarded as the IP address corresponding to the URI named by the DNS request. Then, the process for the packet is terminated.

Figure 20:
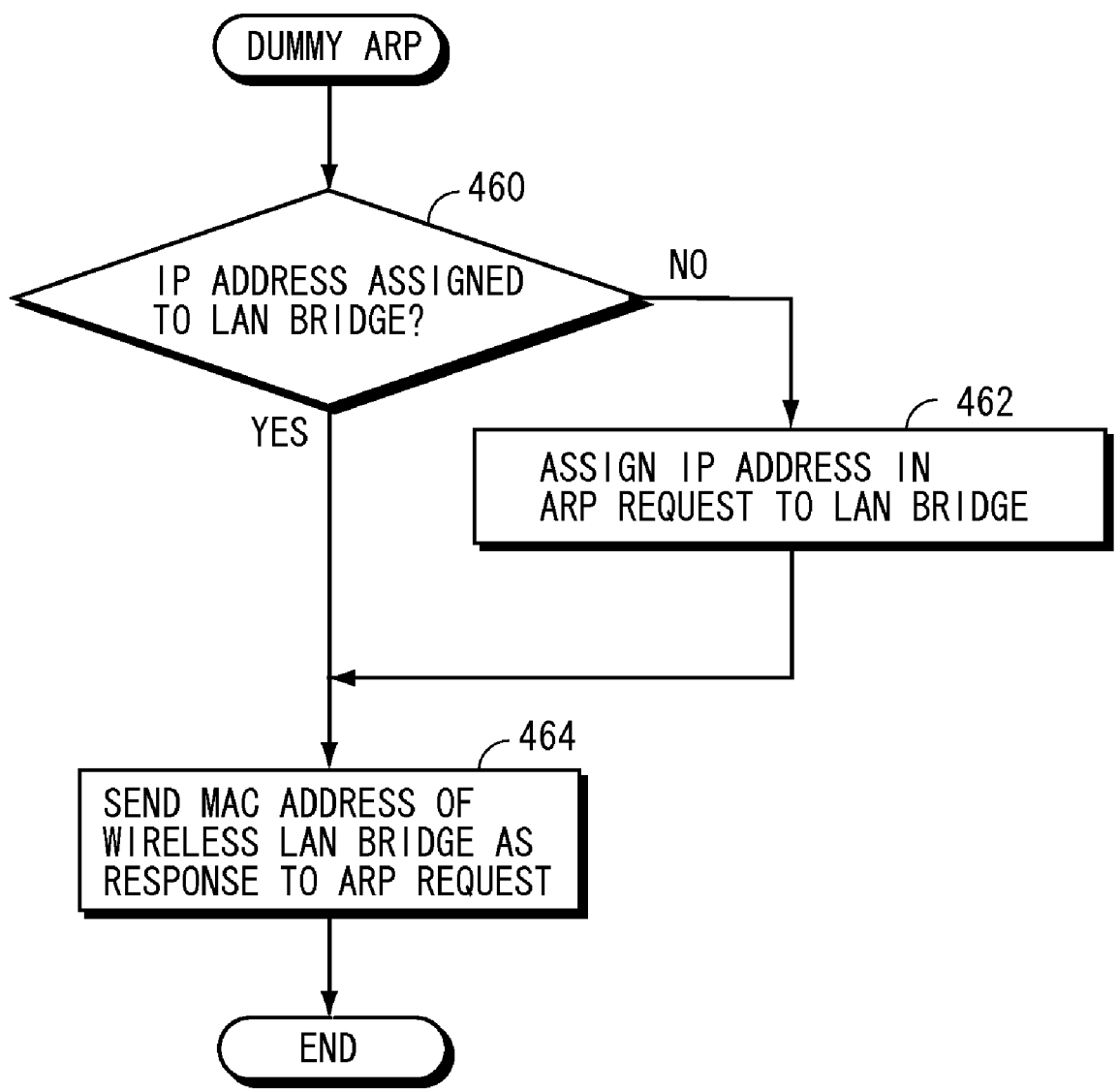
FIG. 20 is a flowchart representing a control structure of a dummy ARP program.

FIG. 20 shows, in the form of a flowchart, a program control structure for implementing dummy ARP server 136 of FIG. 14. The program is activated when bridge 40 enters the configuring mode, and carries out the following process every time it receives an ARP request that names a certain logical address and requests an MAC address of a communication terminal corresponding to the IP address.

Referring to FIG. 20, at step 460, whether an IP address of wireless LAN bridge has already been assigned or not is determined. If an IP address has not yet been assigned, at step 462, the IP address named in the ARP request packet is assigned to bridge 40, and the flow goes to step 464. If the IP address of wireless LAN bridge has already been assigned, the flow directly goes to step 464.

At step 464, as the MAC address that corresponds to the IP address named by the ARP request, the MAC address of bridge 40 is returned to the transmission source of the ARP request, and the process for the packet is terminated.

Figure 21:
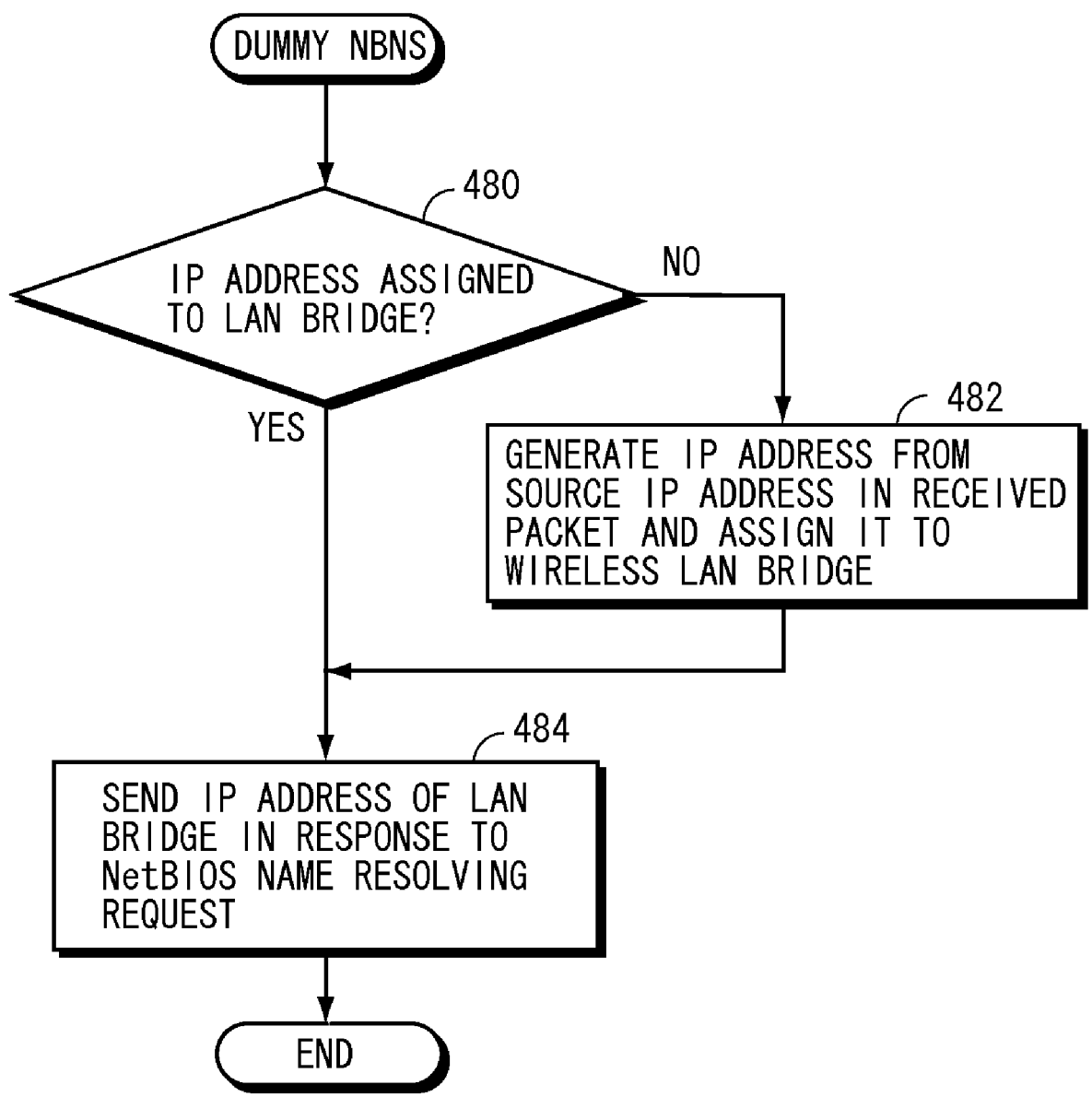
FIG. 21 is a flowchart representing a control structure of a dummy NBNS program.

FIG. 21 shows, in the form of a flowchart, a program control structure for realizing dummy NBNS server 154 of FIG. 14. The program is activated when bridge 40 enters the configuring mode, and carries out the following process every time an NBNS request is received, which names a certain NetBIOS name and requests an IP address of a communication terminal having the NetBIOS name. The NBNS request is broadcast and, hence, the address of the transmission destination (broadcast address) cannot be used as the IP address of a node. Therefore, different from the DNS request having the IP address of the DNS server as the transmission destination, the following process becomes necessary.

Referring to FIG. 21, at step 480, whether an IP address of wireless LAN bridge has already been assigned or not is determined. If an IP address has not yet been assigned, at step 482, a new IP address is generated that belongs to the same segment as the IP address of the transmission source of the received packet, and the generated address is assigned to bridge 40. The new IP address is generated, for example, by adding "1" to last figure of the IP address of the transmission source. Here, if the generated IP address is a reserved IP address, "1" is repeatedly added to the IP address until the IP address becomes available. Then, the control goes to step 484. If it is determined at step 480 that the IP address of wireless LAN bridge has already been assigned, control directly goes to step 484.

At step 484, as the IP address of the device having the NetBIOS name named in the NBNS request, the IP address of bridge 40 is returned to the transmission source of the NBNS request, and the process for the packet is terminated.

<Operation>

Figure 17:
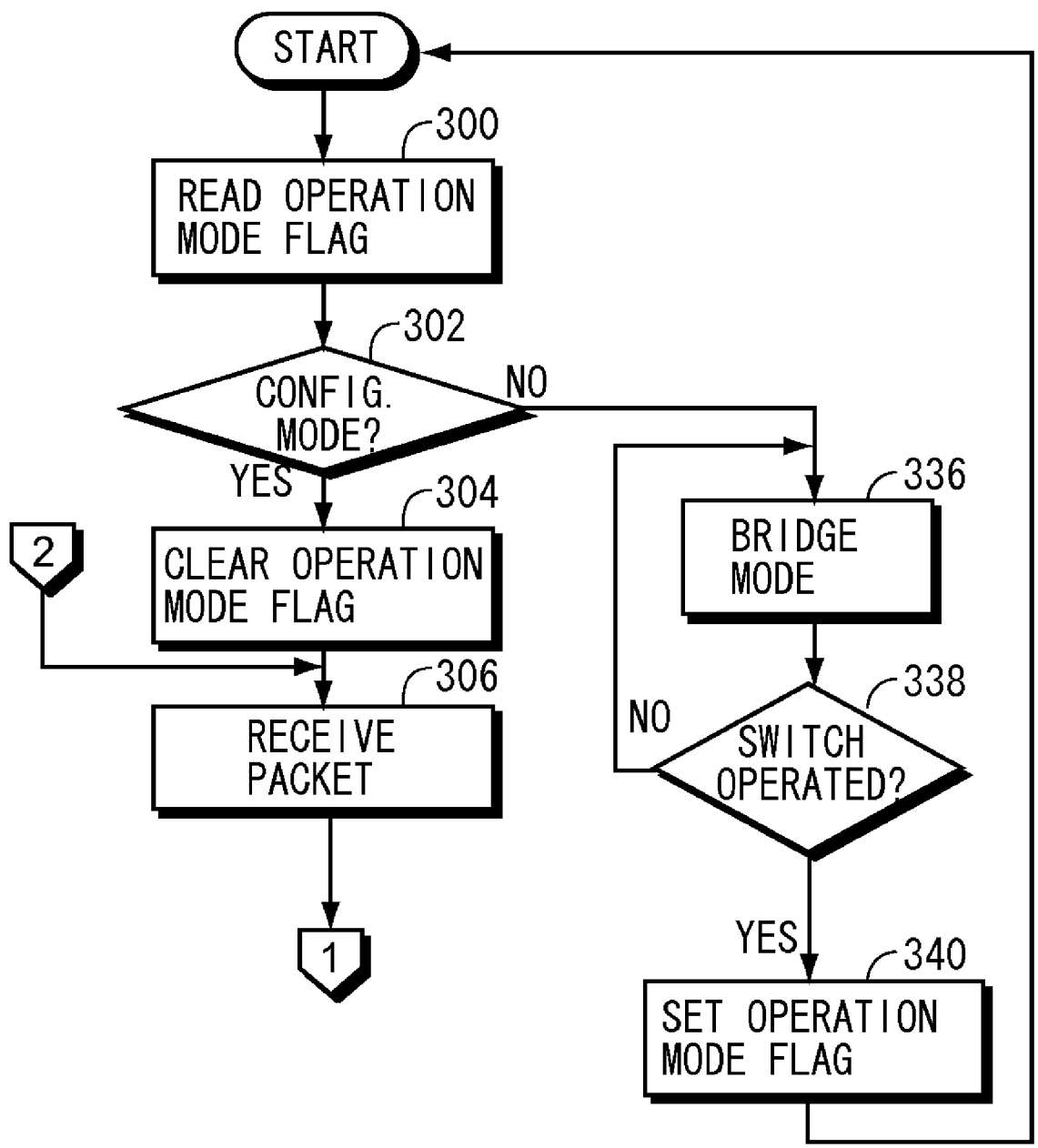
FIG. 17 is a flowchart representing a former half of an operation flow of wireless LAN bridge 40.

With the hardware configuration and software configuration described above, bridge 40 operates as follows. Referring to FIG. 17, when the power of bridge 40 is turned on, at step 300, whether an operational mode flag is set or not is determined. The operational mode flag is stored in RAM 214 shown in FIG. 13, and indicates whether wireless LAN bridge is in the normal operation mode or in the configuring mode. If the flag is set, the operation is in the configuring mode, and if it is reset, the operation is in the operational mode. At step 300, the operational mode flag is read from RAM 214.

At step 302, whether the read operational mode flag has a value indicating the configuring mode or not is determined. If YES, the control goes to step 304, and if not, the control goes to step 336.

At step 336, a prescribed program for implementing the functions of a common bridge is carried out until the power is turned off. It is noted that CPU 210 shown in FIG. 13 periodically (in the present embodiment, at every 10 seconds) monitors an output from push switch 174. Whether push switch 174 has been kept pressed for more than a prescribed time period or not (in the present embodiment, for 5 seconds or longer) is periodically determined in the process of step 336 (338). If it is determined that push switch 174 has been kept pressed for the prescribed time period or more, the control goes to step 340, at which the operational mode flag in RAM 214 shown in FIG. 13 is set, and bridge 40 is rebooted.

If the operational mode is determined to be the configuring mode at step 302, the operational mode flag is cleared at step 304. Because of this process, when the power of bridge 40 is turned on again at the end of the configuring mode, wireless LAN bridge starts operation in the normal operation mode.

Figure 18:
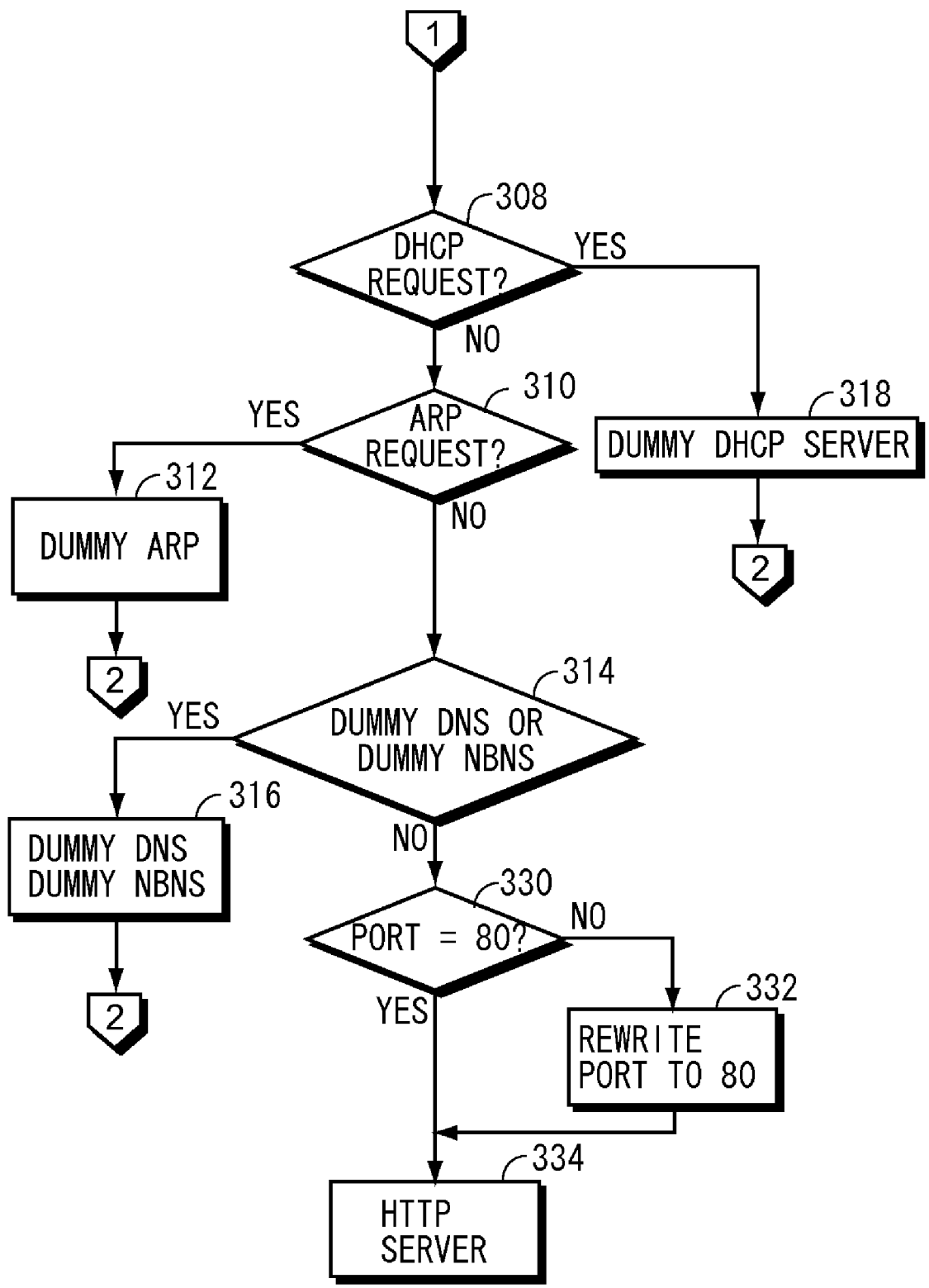
FIG. 18 is a flowchart representing a latter half of an operation flow of wireless LAN bridge 40.

At next step 306, the flow waits for reception of any packet from connector 170 and, upon receiving a packet, the flow goes to step 308 shown in FIG. 18. As is apparent from the description related to FIGS. 4 to 10, the packet received at step 306 is a DHCP request, an ARP request, a name resolving request for DNS or NBNS, or an HTTP request. Upon reception of the packet, control goes to step 308.

At step 308, whether the received packet is a DHCP request or not is determined. If the received packet is a DHCP request (IP address assignment request 62 of FIG. 4, 6 or 8), the control goes to step 318, and otherwise (that is, if the received packet is an ARP request, DNS request, or NBNS request), the control goes to step 310.

At step 318, by dummy DHCP server, an IP address is assigned to PC 42 and an IP address of bridge 40 is generated, as described above. Further, a DHCP response is transmitted to the transmission source of the DHCP request, and the flow goes to step 306 to receive the next packet.

On the other hand, at step 310, it is determined whether the received packet is an ARP request. If it is an ARP request, the flow goes to step 312, where the MAC address of bridge 40 is returned as the MAC address that corresponds to the IP address named by the dummy ARP server, and the named IP address is assigned to the bridge 40 (see FIG. 20). Then, the flow goes to step 306 of FIG. 17.

If it is determined at step 310 that the received packet is not an ARP request (that is, a name resolving request for DNS or NBNS, or an HTTP request), the flow goes to step 314. At step 314, whether the received packet is addressed to the dummy DNS or dummy NBNS is determined. If the result of determination is YES, the flow goes to step 316. If not, the packet is naturally an HTTP packet and, the control goes to step 330.

At step 316, the IP address of the transmission destination of the received packet (for DNS) or the IP address generated from the IP address of the transmission source is assigned to bridge 40 by the dummy DNS or dummy NBNS, and the IP address assigned to bridge 40 is returned to the transmission source of the DNS or NBNS name resolving request (see FIGS. 16 and 21). Then, the control returns to step 306 of FIG. 17, to wait for the next packet.

When the control goes from step 314 to step 330, the packet that may possibly be received will be an HTTP request, in any of FIGS. 4 to 10. At step 330, it is determined whether the port number in the received packet is 80. If it is 80, the flow goes to step 334, and the configuring form is transmitted by HTTP service 268 to PC 42. Thereafter, communication with PC 42 by HTTP service 268 is carried out. If it is determined at step 330 that the port number in the received packet is other than 80, the port number is replaced with 80 (regarded as 80) at step 332, and the flow goes to step 334. The process after step 334 is the same as that when the port number is 80. It is noted, however, that the process of HTTP service 268 is carried out assuming that the port number is 80, even when other port number is input.

By the programs having such a control structure as described above, the operation shown in FIGS. 4 to 10 is realized.

In the configuring mode described above, a user may erroneously connect an operating network to bridge 40. In consideration of such a possibility, bridge 40 of the present embodiment prevents trouble of the network caused by such an error, by the following process.

Figure 19:
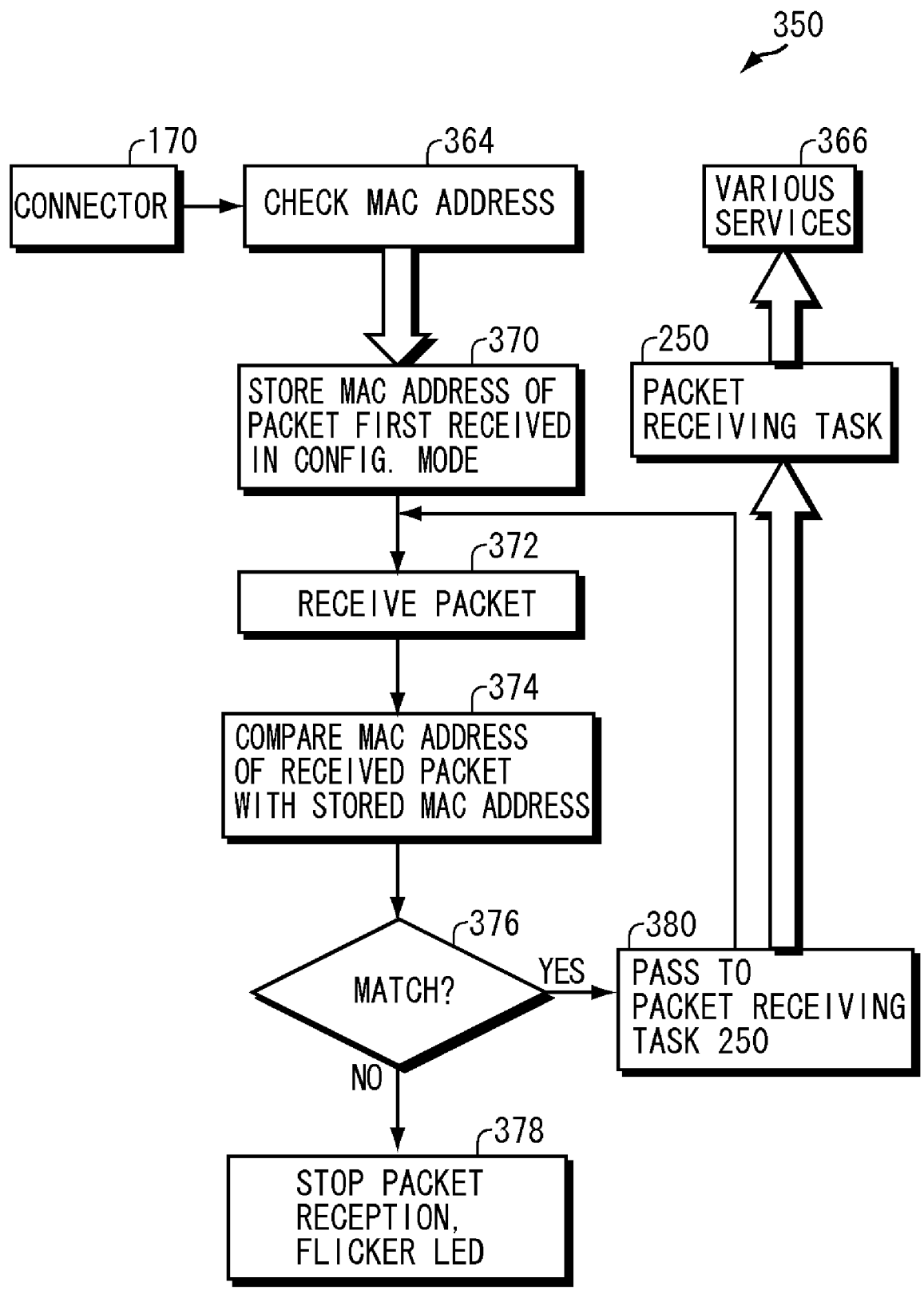
FIG. 19 schematically shows a configuration of a source MAC address check task of wireless LAN bridge 40.

Referring to FIG. 19, in the configuring mode, on every packet received through connector 170, a process of checking the MAC address of the transmission source is executed by a MAC address check task 364. The functions of MAC address check task 364 will be described later. Only the packets determined to be free of any problem by the MAC address check task 364 are passed to various services 366 through packet receiving task 250 shown in FIG. 14. If it is determined by the MAC address check task 364 that there is some problem, an error process is invoked as will be described later, and the process on the received packet is abandoned.

Referring to FIG. 19, details of the process 350 of MAC address check task 364 will be described. Entering the configuring mode, MAC address check task 364 stores the MAC address of a packet first received through connector 170, for example, in RAM 214 shown in FIG. 13 (370). Thereafter, at step 372, every time a subsequent packet is received through connector 170, the MAC address of the transmission source in the packet is compared with the MAC address of the first packet stored in RAM 214, and whether the two match or not is determined (step 376).

If the two match, the packet is free of any problem and, therefore, the packet is passed to packet receiving task 250 at step 380, and packet receiving task 250 passes the packet to various services 366. Then, the flow returns to step 372, to wait for reception of a next packet.

If it is determined at step 376 that the MAC addresses of the two packets do not match, the flow goes to step 378. At step 378, as it is considered that the configuring mode has been started with erroneous connection, the following error process is carried out. Specifically, bridge 40 stops reception of a packet, and causes LEDs 166 shown in FIGS. 11 and 13 to flicker, notifying the user of an error.

By the MAC address check task 364, adverse effects to the network can be minimized even when the bridge 40 is activated in the configuring mode while bridge 40 is connected to an operating network.

As described above, by bridge 40 in accordance with the present embodiment, it is possible for the user to open the configuring form page of bridge 40, simply by connecting bridge 40 to a PC 42 in a one-to-one manner, activating a browser and inputting an arbitrary URI. It is unnecessary to input a specific URI. PC 42 for configuring bridge 40 may have a fixed IP address assigned thereto, or an IP address dynamically assigned by a DHCP service. Even when an IP address rather than a URI is input to the browser, it is possible to correctly access the configuring information.

As a result, even a user not familiar with the network can easily access the information for configuring bridge 40 and configure the bridge 40.

A network using TCP/IP has been described as an example, and functions of DHCP, DNS, NBNS, ARP and the like are discussed. The present invention, however, is not limited to a TCP/IP network, and the invention is applicable to any network having similar address assigning mechanism or using a name resolving mechanism similar to the name resolution of URI in accordance with DNS or NBNS.

Though the embodiment described above is related to a wireless LAN bridge, the present invention is not limited to such an embodiment. The present invention is generally applicable to initial configuration and re-configuration of a network device not having its own user interface for configuration. Further, the invention is applicable not only to a device establishing wireless connection to the network but also to a device establishing connection to the network by a cable. Further, the application is not limited to a bridge, and the invention is applicable to a so-called printer server or to a printer. Though the present invention is particularly effective to devices not having their own user interfaces, the present invention is also applicable to devices having their own user interfaces. By way of example, the present invention may be effective when applied to a device having only a small monitor and a few buttons, as configuring through an external PC is far more efficient.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A network device having a first operational mode and a second operational mode, the network device comprising:
    storage means for storing a configuration parameter of said network device;
    packet receiving means for receiving a communication packet;
    address generating means for responsive responding to said packet receiving means receiving a communication packet in said first operational mode, for generating a logical address on a network in accordance with a prescribed address generating scheme and for assigning the logical address to said network device as an assigned address;
    identifier resolving means for responding to the communication packet received by said packet receiving means being a packet inquiring an unknown logical address corresponding to an identifier of a resource on the network, for transmitting a returned logical address of said network device to a transmission source of said communication packet that inquired the unknown logical address, regardless of the identifier;
    parameter setting means for storing the returned logical address in said storage means; as a value of the configuration parameter transmitted in said first operational mode;
    means for realizing a prescribed network function by communication using said value of the configuration parameter stored in said storage means, in said second operational mode;
    physical address storage means for storing a physical address of a transmission source of a packet first received by said packet receiving means in said first operational mode; and
    error processing means for comparing a physical address of a source of a packet received secondly or thereafter by said packet receiving means in said first operational mode with the physical address stored in said physical address storage means, and for carrying out a predetermined error process when the compared addresses are different.

2. The network device according to claim 1, wherein said address generating means includes dynamic address generating means, responsive to said packet receiving means receiving a logical address assignment requesting packet in said first operational mode, for generating first and second logical addresses of mutually communicable relation in accordance with a prescribed address determining scheme, for returning said first logical address to said transmission source as the returned logical address, and for assigning said second logical address to said network device as the assigned logical address.

3. The network device according to claim 1, wherein said address generating means includes means, responsive to said packet receiving means receiving a communication packet in said first operational mode, for generating the assigned logical address of said network device in accordance with a prescribed address determining scheme, based on transmission source address information included in said received communication packet, to allow communication with a transmission source of said communication packet.

4. The network device according to claim 1, wherein said address generating means includes means, responsive to said packet receiving means receiving a communication packet, in said first operational mode, for setting transmission destination address information included in said received communication packet as said assigned logical address of said network device.

5. The network device according to claim 1, wherein
    said network includes a network following TCP/IP protocol;
    said assigned logical address includes an IP address of a device on said network;
    said resource identifier includes a URI;
    the communication packet inquiring the unknown logical address corresponding to the identifier of the resource on said network includes a name resolving request for the URI; and
    said identifier resolving means includes a DNS server running on said network device in said first operational mode.

6. A method comprising the following steps done by a network device:
    receiving a first communication packet while the network device is in a configuring mode;
    in response to the first communication packet, generating a logical address on a network in accordance with a prescribed address generating scheme, and assigning that logical address to the network device;
    receiving from a transmission source a logical address inquiring packet while the network device is in the configuring mode, the logical address inquiring packet corresponding to an identifier of a resource on the network;
    storing, as a value of a configuration parameter, at least one of the following: the logical address generated and assigned to the network device, a second logical address generated by the network device;

realizing a prescribed network function by communication using the stored value of the configuration parameter, while the network device is in a normal operation mode;

comparing a physical address of a source of a packet received while the network device is in a configuring mode with a physical address stored in the network device; and carrying out a predetermined error process when the compared addresses are different.

7. The method of claim 6, wherein the step of receiving a first communication packet includes receiving a logical address assignment requesting packet, wherein the method includes transmitting to the transmission source the second logical address generated by the network device, and wherein the second logical address is of mutually communicable relation with the logical address assigned to the network device.

8. The method of claim 6, wherein the step of generating a logical address in response to the first communication packet generates the logical address based on transmission source address information included in the first communication packet.

9. The method of claim 6, wherein the method includes setting transmission destination address information included in the first communication packet as the logical address of the network device.

10. The method of claim 6, wherein:

the step of generating a logical address generates an IP address;

the logical address inquiring packet corresponds to an identifier which includes a URI; and the logical address inquiring packet includes a name resolving request for the URI.

* * * * *